US007990491B2

(12) United States Patent
Kajita et al.

(10) Patent No.: US 7,990,491 B2
(45) Date of Patent: Aug. 2, 2011

(54) LIQUID CRYSTAL DISPLAY DEVICE

(75) Inventors: Daisuke Kajita, Hitachi (JP); Yoshifumi Sekiguchi, Hitachioota (JP); Akitoyo Konno, Hitachi (JP); Makoto Tsumura, Hitachi (JP); Ikuo Hiyama, Hitachinaka (JP)

(73) Assignee: Hitachi Displays, Ltd., Chiba (JP)

( * ) Notice: Subject to any disclaimer, the term of this patent is extended or adjusted under 35 U.S.C. 154(b) by 295 days.

(21) Appl. No.: 12/251,473

(22) Filed: Oct. 15, 2008

(65) Prior Publication Data
US 2009/0096951 A1 Apr. 16, 2009

(30) Foreign Application Priority Data
Oct. 15, 2007 (JP) .................. 2007-268439

(51) Int. Cl.
G02F 1/13357 (2006.01)
G02F 1/1333 (2006.01)
(52) U.S. Cl. .......................... 349/64; 349/58
(58) Field of Classification Search .............. 349/58–60, 349/64, 65; 362/97.1, 97.2, 97.4, 632–634
See application file for complete search history.

(56) References Cited

U.S. PATENT DOCUMENTS

| 6,573,956 B1 * | 6/2003 | Shibata ........................... 349/65 |
| 7,295,263 B2 * | 11/2007 | Shiraishi et al. ................ 349/67 |
| 7,753,539 B2 * | 7/2010 | Jung et al. ....................... 362/29 |
| 2001/0040657 A1 * | 11/2001 | Gomi et al. .................... 349/112 |
| 2007/0047264 A1 * | 3/2007 | Joo et al. ....................... 362/633 |
| 2008/0049167 A1 * | 2/2008 | Abo et al. ....................... 349/64 |
| 2009/0086121 A1 * | 4/2009 | Sekiguchi et al. .............. 349/58 |
| 2009/0096955 A1 * | 4/2009 | Konno et al. .................... 349/64 |

FOREIGN PATENT DOCUMENTS

| CN | 1307477 | 3/2007 |
| CN | 100489617 | 5/2009 |
| JP | 07-301802 | 11/1995 |
| JP | 08-101312 | 4/1996 |
| JP | 2006-032358 | 2/2006 |
| JP | 2007-184232 | 7/2007 |

* cited by examiner

Primary Examiner — Michelle R Connelly Cushwa
(74) Attorney, Agent, or Firm — Antonelli, Terry, Stout & Kraus, LLP.

(57) ABSTRACT

A liquid crystal display device has a thin structure with a backlight device appropriate for illuminating a liquid crystal panel where there is no area in band form where the brightness is inconsistent. The size of the diffusion plate that forms the optical sheet of the backlight device is made smaller than the opening for illumination in the diffusion region, and the diffusion plate is not provided in the vicinity of the end portions of the opening for illumination in the configuration. In this configuration, the reflection properties are different in the vicinity of the end portions and as the center portion of the opening for illumination, and the brightness increases in the vicinity of the end portions of the backlight device, so that an area in band form where the brightness is inconsistent can be prevented from being created in the end portions of the display device.

23 Claims, 16 Drawing Sheets

LIQUID CRYSTAL DISPLAY DEVICE

The present application claims priority over Japanese Application JP2007-268439 filed on Oct. 15, 2007, the contents of which are hereby incorporated into this application by reference.

BACKGROUND OF THE INVENTION (1) Field of the Invention

The present invention relates to a liquid crystal display device.

(2) Related Art Statement

In recent years, use of light emitting plasma display panels and non-light emitting liquid crystal display devices instead of CRT's (cathode ray tubes) as displays has been increasing.

From among these, liquid crystal display devices use a liquid crystal panel as a transmission type light modulation element, and the rear surface is provided with an illuminating device (hereinafter referred to as backlight device), and the liquid crystal panel is illuminated with light. In addition, the liquid crystal panel forms an image by controlling the transmittance of light emitted from the backlight device.

One feature of liquid crystal display devices is that they can be made thin in comparison with CRT's, and in recent years, thinner liquid crystal display devices have been in demand. Therefore, it is required for backlight devices that form liquid crystal display devices to be thinner. As for technology relating to such backlight apparatuses for liquid crystal display devices, Patent Document 1 discloses a backlight device using an EEFL (external electrode fluorescent lamp), for example, and Patent Document 2 discloses a backlight device using a CCFL (cold cathode fluorescent lamp), for example.

(Patent Document 1) Japanese Unexamined Patent Publication 2007-184232 (see paragraph 0052)

(Patent Document 2) Japanese Unexamined Patent Publication 2006-032358 (see paragraph 0016)

SUMMARY OF THE INVENTION

Problem to Be Solved by the Invention

EEFL's and CCFL's are fluorescent tubes formed of thin, long tubes, and therefore, as disclosed in Patent Document 1 and Patent Document 2, backlight devices using fluorescent tubes, such as EEFL's and CCFL's, can be made thin. However, in backlight devices using fluorescent tubes, such as EEFL's and CCFL's, the brightness in the two end portions is extremely low and the tubes dark. This is because electrodes are formed in the two end portions of the fluorescent tubes.

In the space between the fluorescent tubes and the diffusion plate provided on the front surface of conventional backlight devices light emitted by the fluorescent tubes diffuses, and furthermore, when light diffuses and is repeatedly reflected by optical members, such as a diffusion plate or an optical sheet, the brightness of the backlight device can be made uniform. Thus, light emitted by long fluorescent tubes, for example, can be converted to a surface light source.

When the thickness of backlight devices is further reduced, however, the distance between the fluorescent tubes and the diffusion plate becomes short, and therefore, light emitted by the fluorescent tubes cannot sufficiently diffuse. Even when light diffuses and is reflected by optical members, such as a diffusion plate or an optical sheet, in this state, the brightness becomes insufficient on the end portion sides of the backlight device. When the brightness becomes insufficient on the end portion sides of the backlight device, the liquid crystal panel is not illuminated on the end portion sides, and thus, the two ends of the liquid crystal panel become dark. In addition, when the two ends of the liquid crystal panel become dark, a problem arises, such that an area in band form where the brightness is inconsistent appears at the two ends, left and right, of the image displayed on the liquid crystal display device. As a simple means for solving this problem, it is possible to make the area of the backlight device sufficiently greater than the area of the liquid crystal panel. However, new problems arise with the productivity and appearance, such that the frame portion of the liquid crystal display device becomes large.

Thus, an object of the present invention is to provide a liquid crystal display device having a backlight device appropriate for illuminating the liquid crystal panel in a thin structure without any areas in band form where the brightness is inconsistent, and a small frame portion.

Means for Solving Problem

In order to solve the above described problem, the present invention provides a liquid crystal display device having a backlight device where there is no lack of brightness in the two end portions due to the form of the optical member for reflecting light emitted by the light source.

Effects of the Invention

The present invention can provide a liquid crystal display device having a backlight device appropriate for illuminating the liquid crystal panel in such a manner that there is no area in band form where the brightness is inconsistent even in a thin structure.

BRIEF DESCRIPTION OF THE DRAWINGS

FIG. 11(*b*) is a cross sectional diagram along X4-X4 in FIG. 11(*a*);

FIG. 11(*c*) is a diagram showing a slightly reflective member having an opening at the center;

FIG. 12(*b*) is a diagram showing the configuration of a modification 2-1;

FIG. 13(*b*) is a cross sectional diagram along X4-X4 in FIG. 11 showing the configuration of a modification 2-2.

EXPLANATION OF SYMBOLS

Figure 1:
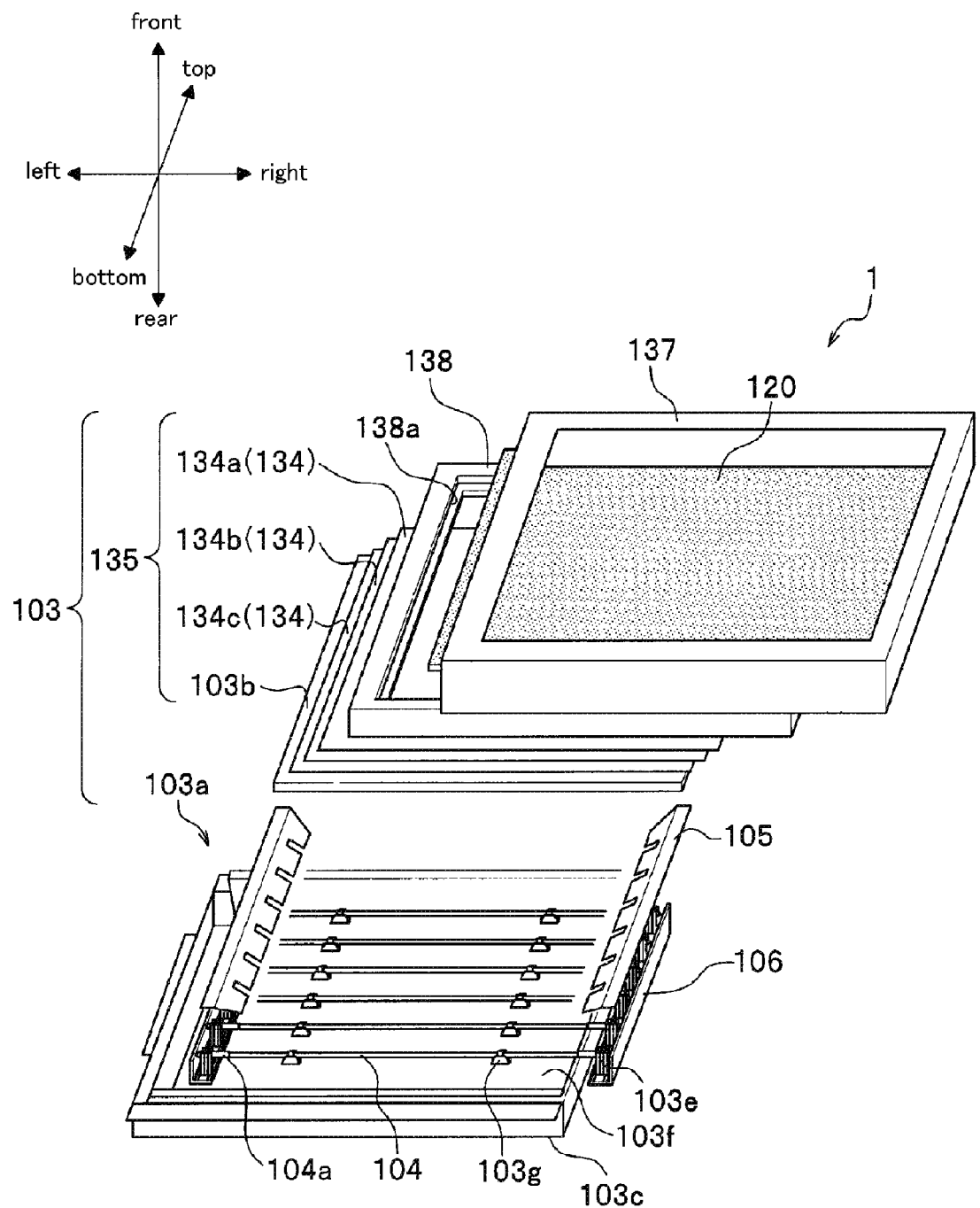
FIG. 1 is a perspective diagram showing the configuration of the liquid crystal display device according to the first embodiment.

1 liquid crystal display device
103 backlight device
103*a* light source unit
103*b* diffusion plate
103*b*1 diffusion plate with prisms
103*b*2 light curtain (entrance restricting region)
103*c* lower frame (housing)
103*d* bottom
103*e* electrode holder
103*f* reflection sheet
103*g* tube holder
104 fluorescent tubes (light source)
104*a* electrode portion
105 upper side mold (cover member)
105*a* light blocking plate
105*b* upper surface portion
106 lower side mold
120*a* signal wire driving circuit
120*b* scanning wire driving circuit
120*c* signal wire
120*d* scanning wire
120*e* TFT
120*f* liquid crystal
120*g* pixel electrode
120*h* counter electrode
134 optical sheet
134*a* reflection polarizing plate
134*b* prism sheet
134*c* diffusion sheet
134*c*1 diffusion portion
134*c*2 slightly reflective portion
134*d* slightly reflective member
134*d*1 opening
135 optical member
137 upper frame
138 middle frame
138*a* trench
120 liquid crystal panel
C left-right center
D diffusion region
Do opening for illumination (opening in diffusion region)
F plane portion
L light
Ld effective display region
P prism pattern
S cover region

DETAILED DESCRIPTION OF THE INVENTION

Best Mode for Carrying Out the Invention

First Embodiment

In the following, the best mode for carrying out the present invention is described in detail in reference to the drawings. FIG. 1 is a perspective diagram showing the configuration of the liquid crystal display device according to the first embodiment, FIG. 2(*a*) is a schematic diagram showing a prism sheet, FIG. 2(*b*) is a diagram showing a diffusion sheet, FIG. 3(*a*) is a diagram showing the arrangement of wires and drive circuits on a liquid crystal panel, and FIG. 3(*b*) is a diagram showing the arrangement of TFT's (thin film transistors) and pixel electrodes. As shown in FIG. 1, in the first embodiment top, bottom, left, right, front and rear are defined with the display screen of the liquid crystal panel 120 as the reference.

As shown in FIG. 1, the liquid crystal display device 1 according to the first embodiment is mainly formed of a liquid crystal panel 120, a backlight device 103, an upper frame 137, a middle frame 138 and the like.

Furthermore, the liquid crystal display device 1 is provided with a control device for controlling the liquid crystal display device 1 and a drive portion with a DC/DC power supply for supplying a power supply voltage to the backlight device 103 and the like. The control device is a device which controls the liquid crystal panel 120, the backlight device 103 and the like, and processes the image displayed on the liquid crystal display device 1, and is formed of a computer, not shown, having a CPU (central processing unit), a RAM (random access memory), a ROM (read only memory) and the like, as well as programs, periphery circuits and the like, and driven by the programs stored in the ROM.

The upper frame 137 is made of a metal, such as iron or aluminum, provided on the front of the liquid crystal panel 120, and functions as a front cover for the liquid crystal display device. In addition, the upper frame 137 has such a form that there is an opening for the display area portion for the liquid crystal display device 1.

In addition, the middle frame 138 is made of a resin, provided in the rear of the liquid crystal panel 120, and functions to secure the liquid crystal panel 120. The middle frame 138 has an opening in the center portion so that the backlight device 103 provided in the rear can illuminate the liquid crystal panel 120, and a trench 138*a* is created around the opening.

The liquid crystal panel 120 is engaged in the trench 138*a* of the middle frame 138, and after that secured to the middle frame 138 using an adhesive or the like. In addition, the upper frame 137 is secured to the middle frame 138 to which the liquid crystal panel 120 is secured using an adhesive or the like.

The backlight device 103 is formed of a light source unit 103*a*, a diffusion plate 103*b* and an optical sheet 134.

The light source unit 103*a* has a configuration where long fluorescent tubes 104, such as EEFL's, which become a light source, are aligned on the lower frame 103*c* having an opening on the front side so as to be parallel to the longitudinal direction of the lower frame 103*c*. Here, the lower frame 103*c* is a member which functions as a housing for the light source unit 103*a*. In addition, a diffusion plate 103*b* is provided so as to cover the opening in the lower frame 103*c*.

Furthermore, an inverter for driving the fluorescent tubes 104, not shown, is provided with the backlight device 103.

Here, the fluorescent tubes 104 are not limited to EEFL's, and may be other types of fluorescent tubes, such as CCFL's or HCFL's (hot cathode fluorescent lamps). In addition, though six fluorescent tubes 104 are shown in FIG. 1, the number is not limited. A 32 inch liquid crystal panel 120, for example, requires 16 to 20 EEFL or CCFL fluorescent tubes 104, 3 to 10 fluorescent tubes 104 in the case of HCFL's.

Furthermore, though not shown, a number of LED's (light emitting diodes), for example, may be used as the light source in the configuration.

Tube holders 103*g* are secured inside the lower frame 103*c*. The tube holders 103*g* and the lower frame 103*c* sandwich a portion of the reflective sheet 103*f*, so that the reflective sheet 103*f* is secured to the lower frame 103*c*. The fluorescent tubes 104 are held by the tube holders 103*g*, and thus secured in predetermined locations above the reflective sheet 103*f*. In addition, the lower side mold 106 is secured to the lower frame 103*c*. Electrode holders 103*e* for holding the electrode portions 104*a* formed at the two ends of the fluorescent tubes 104 are secured to the lower side mold 106. In addition, the diffusion plate 103*b* is secured to the upper side mold 105 provided so as to cover the lower side mold 106.

The reflective sheet 103*f* provided inside the lower frame 103*c* diffuses and reflects light emitted by the fluorescent tubes 104 efficiently toward the front (though this is generally diffusion reflection, it may in some cases be reflection from a mirror surface). Furthermore, the diffusion plate 103*b* provided on the front side of the lower frame 103*c* diffuses and transmits light emitted by the fluorescent tubes 104. As a result, light emitted by the fluorescent tubes 104 diffuses and is repeatedly reflected between the reflective sheet 103*f* and the diffusion plate 103*b*, and is emitted through the diffusion plate 103*b* so as to illuminate the liquid crystal panel 120.

Here, light emitted by the fluorescent tubes 104 diffuses and is repeatedly reflected between the reflective sheet 103*f* and the diffusion plate 103*b*, and is emitted, and after that, a number of optical sheets 134 (three in FIG. 1) provided on the front side of the diffusion plate 103*b* control the dispersion properties and directivity of light.

The optical sheets 134 are provided in the rear of the middle frame 138 and function to provide directivity for light emitted from the light source unit 103*a*, in order to increase the uniformity within a plane, as well as the brightness in the direction toward the front.

There are three optical sheets 134 in the first embodiment, and these are provided with a reflection polarizing plate 134*a*, a prism sheet 134*b* and a diffusion sheet 134*c* in this order from the front side, that is to say, the liquid crystal panel 120 side, in the configuration.

The reflection polarizing plate 134*a* functions to polarize light emitted by the fluorescent tubes 104, and provides directivity.

The prism sheet 134*b* is a member in sheet form where a prism pattern in triangular pole form is formed on the surface, for example. FIG. 2(*a*) is a schematic diagram showing a prism sheet. As shown in FIG. 2(*a*), a prism pattern P in triangular pole form is provided on the front surface of the prism sheet 134*b* so as to be parallel to the left-right direction. The prism sheet is secured to the backlight device 103 (see FIG. 1) so that the prism pattern P becomes parallel to the fluorescent tubes 104 (see FIG. 1) when incorporated in the liquid crystal device 1 (see FIG. 1), and functions to reflect the component of light emitted by the fluorescent tubes 104 which enters to the front and collect the component of light which enters diagonally toward the front.

The diffusion sheet 134*c* functions to diffuse light emitted by the fluorescent tubes 104 uniformly within a plane. FIG. 2(*b*) is a diagram showing a diffusion sheet. As shown in FIG. 2(*b*), the diffusion sheet 134*c* is provided with a diffusion portion 134*c*1 where diffusion particles, not shown, made of microscopic particles are dispersed on the front side and part of light which enters from the rear side is diffused and reflected.

The diffusion plate 103*b* is made of a transparent resin, such as acryl, in which microscopic particles or bubbles are dispersed, and allows light emitted by the fluorescent tubes 104 to diffuse and be reflected, or diffuse and transmit.

In addition, the diffusion plate 103*b* and the optical sheet 134 form an optical member 135.

In the backlight device 103, light emitted by the long fluorescent tubes 104 is reflected by the optical member 135 formed as described above, and diffuses and is repeatedly reflected by the reflective sheet 103*f* and the optical member 135 within the diffusion region, and thus, light is converted so that the surface light source emits light from the front surface of the optical sheet 134. That is to say, the optical member 135 is a member having reflection properties, so that light emitted by the fluorescent tubes 104 returns into the diffusion region, and thus, the light source is converted to a surface light source.

Here, the reflection properties indicate the energy of the diffusion reflection component resulting from the optical member 135 and the directivity of diffusion reflection when light having a certain energy enters from the rear of the optical member 135. In the case where the optical member 135 is formed uniformly, the reflection properties of the optical member 135 are uniform, and thus, light uniformly diffuses and is reflected so that light emitted by the fluorescent tubes 104 is converted to a surface light source.

The backlight device 103 formed in this manner is placed on the rear surface of the liquid crystal panel 120 and functions to illuminate the liquid crystal panel 120 from the rear.

The liquid crystal panel 120 has a configuration where liquid crystal is sandwiched between two glass substrates, and functions as an optical shutter for controlling transmission and blocking of light emitted from the backlight device 103, by controlling the orientation of liquid crystal molecules that form the liquid crystal.

Figure 3A:
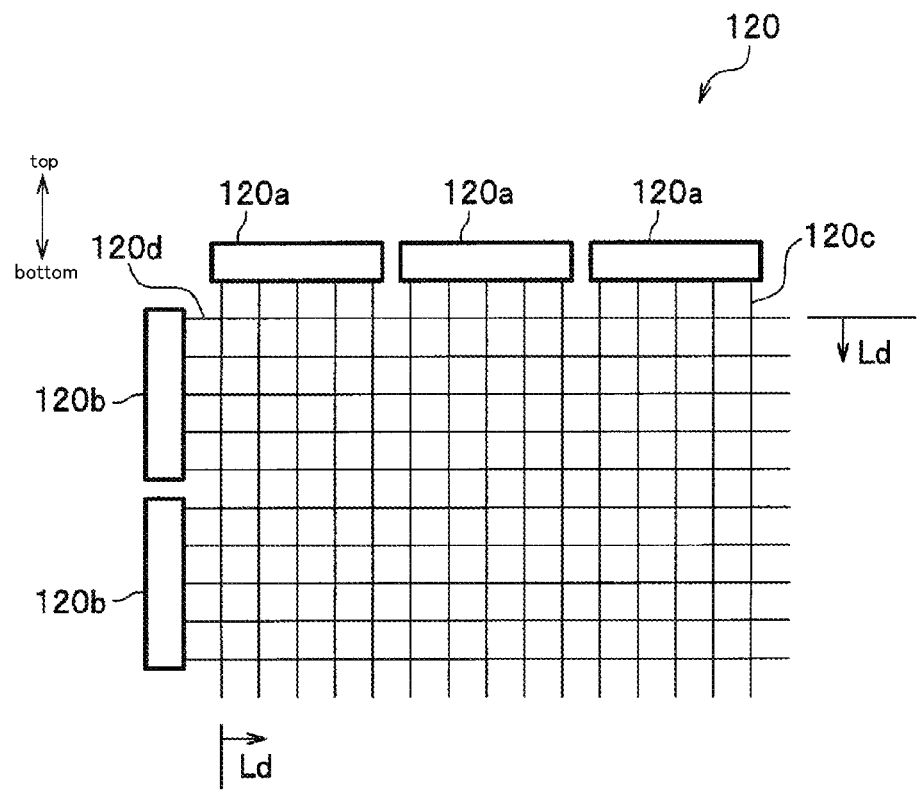
FIG. 3(a) is a diagram showing the arrangement of wires and drive circuits on a liquid crystal panel.
Figure 3B:
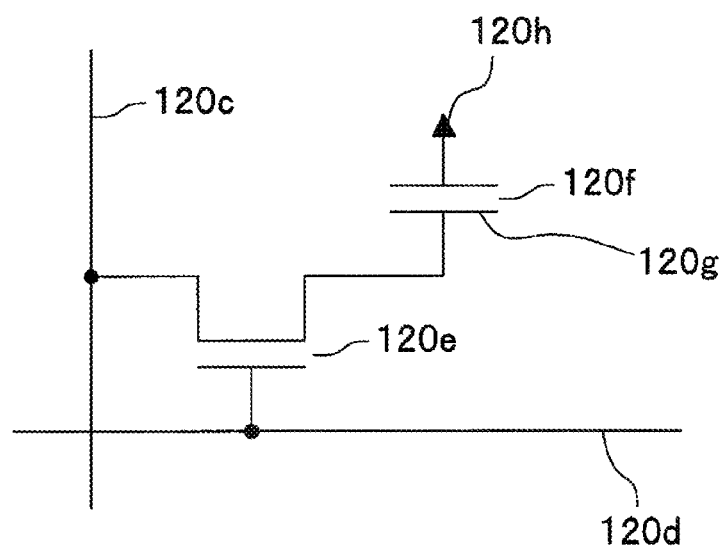
FIG. 3(b) is a diagram showing the arrangement of TFT's and pixel electrodes.

FIG. 3(*a*) is a diagram showing the arrangement of wires and drive circuits on a liquid crystal panel, and FIG. 3(*b*) is a diagram showing the arrangement of TFT's and pixel electrodes.

As shown in FIG. 3(*a*), signal wires 120*c* and scanning wires 120*d* are provided on the liquid crystal panel 120 in grid form, and signal wire driving circuits 120*a* for driving the signal wires 120*c* and scanning wire driving circuits 120*b* for driving the scanning wires 120*d* are provided.

In addition, as shown in FIG. 3(*b*), TFT's 120*e* for driving the liquid crystal 120*f* are connected at the intersections between the signal wires 120*c* and the scanning wires 120*d*. When a positive voltage is applied to a scanning wire 120*d*, the TFT's 120*e* electrically connect the signal wires 120*c* and the pixel electrodes 120*g*. At this time, a voltage corresponding to the image data is applied to the pixel electrodes 120*g* from the signal wire 120*c* so that the shutter for the liquid crystal 120*f* opens or closes in accordance with the voltage between the pixel electrodes 120*g* and the counter electrodes 120*h*. When the shutter for the liquid crystal 120*f* opens, light emitted from the backlight device 103 shown in FIG. 1 transmits, making the pixel bright. When the shutter for the liquid crystal 120$f$ is not open, the pixel becomes dark.

The relationship between the opening and closing of the shutter for the liquid crystal 120$f$ and the voltage applied to the liquid crystal (which is almost the same as the voltage between the pixel electrode 120$g$ and the counter electrode 120$h$) depends on the so-called display mode of the liquid crystal 120$f$. In an example of the display mode for a liquid crystal panel 120 for a general television receiver, when the absolute value of the voltage applied to the liquid crystal 120$f$ is great (approximately 5 V), the pixel becomes bright, and when it is small (approximately 0 V), the pixel becomes dark. At this time, for voltages between 0 V and 5 V, the greater the absolute value of the voltage is, the brighter the pixel becomes, though the relation is non-linear. In addition, gradation can be displayed by dividing the range between 0 V and 5 V into appropriate sections. It goes without saying that there are no limitations in these display modes according to the present invention.

In addition, in the case where a negative voltage is applied to the scanning wire 120$d$ connected to a TFT 120$e$, the connection between the signal wire 120$c$ and the pixel electrode 120$g$ becomes of a state of high resistance, so that the voltage applied to the liquid crystal 120$f$ can be maintained.

As described above, the liquid crystal 120$f$ is controlled by the voltage applied across the scanning wire 120$d$ and the signal wire 120$c$ in the configuration.

The scanning wire driving circuits 120$b$ function to scan the pixels with a certain period, so that a predetermined voltage is applied to the scanning wires 120$d$ one by one from the top to the bottom, for example. In addition, signal wire driving circuits 120$a$ apply a voltage corresponding to the respective pixels connected to the scanning wire 120$d$ to which a predetermined voltage is applied by a scanning wire driving circuit 120$b$ to the respective signal wires 120$c$.

In this configuration, the scanning wire 120$d$ to which a voltage is applied can set bright pixels and dark pixels. In addition, as the scanning wire driving circuits 120$b$ scan the pixels, the signal wire driving circuits 120$a$ control the voltage applied to the respective signal wires 120$c$, and thus, bright pixels and dark pixels can be set for all of the scanning wires 120$d$, and an image can be formed on the liquid crystal panel 120.

Here, the signal wire driving circuits 120$a$ and the scanning wire driving circuits 120$b$ are controlled by a control device, not shown, provided in the liquid crystal display device (see FIG. 1) for example, in the configuration.

The control device, not shown, functions to manage an image signal to be displayed on the liquid crystal panel 120 as information on the brightness for each portion of the liquid crystal 120$f$ (see FIG. 3($b$)). In addition, the scanning wire driving circuits 120$b$ are controlled so that the pixels are scanned when a predetermined voltage is applied to the scanning wires 120$d$ one by one from the top to the bottom, and at the same time, the signal wire driving circuits 120$a$ are controlled so that a predetermined voltage is applied to the respective signal wires 120$c$ corresponding to the information on the brightness of the signal wire 120$c$ which is connected to the TFT 120$e$ connected to the scanning wire 120$d$ to which a predetermined voltage is applied in the configuration.

Here, the liquid crystal panel 120 has an effective display region Ld as that shown in FIG. 3($a$), and an image is displayed in the effective display region Ld.

Figure 4:
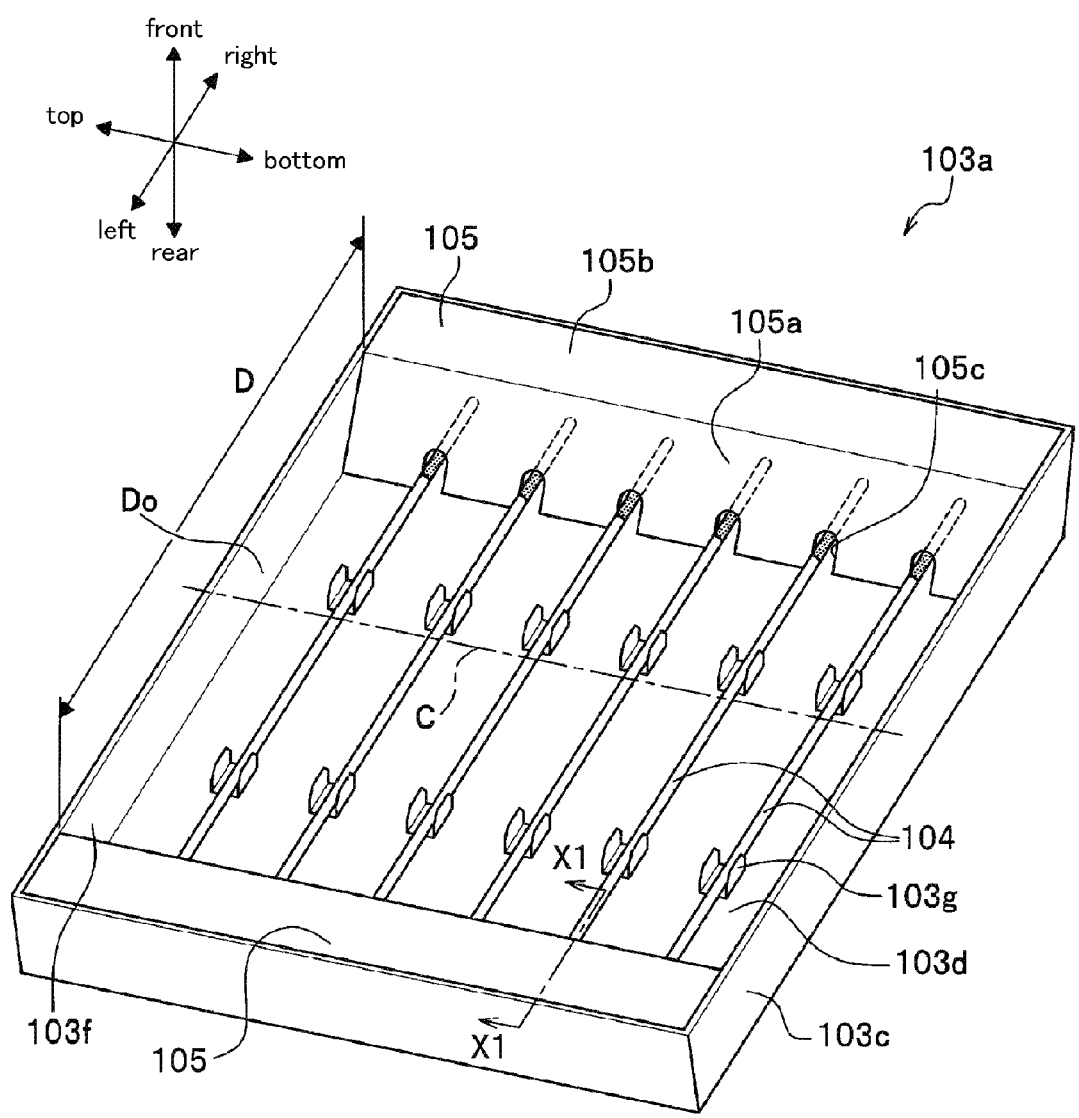
FIG. 4 is a diagram showing a light source unit.

FIG. 4 is a diagram showing a light source unit. As shown in FIG. 4, the lower frame 103$c$ that forms the housing for the light source unit 103$a$ is a member of a shallow box type having an opening on the front side, and a number of fluorescent tubes 104 (six in FIG. 4) are provided on the bottom 103$d$ facing the opening. The material for the lower frame 103$c$ is not limited, and the lower frame is formed of a metal, such as iron, processed into a plate. In addition, it is preferable for a reflective surface which easily reflects light to be formed inside the lower frame 103$c$, in order to reflect light emitted by the fluorescent tubes 104 efficiently toward the front, and as described above, a reflective sheet 103$f$ is provided inside the lower frame 103$c$.

As for the method for forming the reflective surface, a white or silver paint having a high reflectance, for example, may be applied instead of providing a reflective sheet 103$f$.

Upper side molds (cover members) 105 are secured at the two ends, left and right, inside the lower frame 103$c$ using screws, for example. The upper side molds 105 are members made of a resin, for example, and have upper surface portions 105$b$ parallel to the bottom 103$d$ of the lower frame 103$c$ and blocking plates 105$a$ formed so as to decline from the upper surface portions 105$b$ toward the bottom 103$d$ of the lower frame 103$c$. In addition, in a region between facing blocking plates 105$a$ and 105$a$ of upper side molds 105 and 105 provided on the two sides, left and right, of the lower frame 103$c$, which is surrounded by the lower frame 103$c$, a diffusion region D having an opening on the opening surface side of the lower frame 103$c$ is formed. In the following, the opening in the diffusion region d is referred to as opening for illumination Do.

The diffusion region D is a region which is approximately equal to the region of the liquid crystal panel 120 shown in FIG. 1 for displaying an image, and the backlight device 103 emits light that diffuses in the diffusion region D formed in the light source unit 103$a$ through the opening for illumination Do, and thus illuminates the liquid crystal panel 120 from the rear (see FIG. 1).

The liquid crystal panel 120 is provided in such a portion as to cover the opening for illumination Do, and thus, the effective display region Ld (see FIG. 3($a$)) is located in an end portion of the opening for illumination Do. That is to say, the end portion of the opening for illumination Do is in such a location as to correspond to the effective display region Ld (see FIG. 3($a$)). That is to say, the end portion of the opening for illumination Do is in such a location as to correspond to the effective region Ld.

Thus, the optical member 135 shown in FIG. 1 is provided so as to cover the opening for illumination Do.

Here, the single-dot chain line indicated by the symbol C indicates the left-right center, which is the center of blocking plates 105$a$ provided so as to face each other within the lower frame 103$c$, that is to say, the center of the diffusion region D. In addition, the left-right center C approximately coincides with the left-right center of the lower frame 103$c$ and the left-right center of the opening for illumination Do.

In addition, it is preferable for the upper side molds 105 to function to scatter light emitted by the fluorescent tubes 104 by reflecting light toward the opening for illumination Do, and it is preferable for it to be made of a resin which scatters and reflects light.

Figure 5:
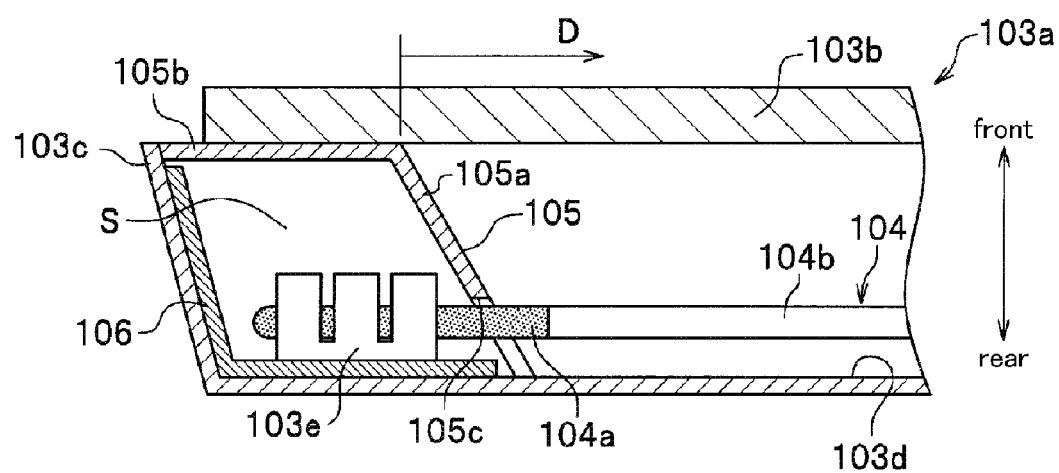
FIG. 5 is a cross sectional diagram along X1-X1 in FIG. 4 when the unit is provided with a diffusion plate.

FIG. 5 is a cross sectional diagram along X1-X1 in FIG. 4 when the unit is provided with a diffusion plate.

The same number of trenches for fixture 105$c$ through which the fluorescent tubes 104 penetrate as fluorescent tubes 104 are provided in the blocking plates 105$a$ and, as shown in FIG. 5, the end portions of the fluorescent tubes 104 penetrate through these.

The fluorescent tubes 104 are formed of light emitting portions 104$b$ for emitting light and electrode portions 104$a$ formed at the two ends which do not emit light, and the electrode portions 104a penetrate through the trenches for fixture 105c. In addition, the electrode portions 104a are held by the electrode holders 103e in the cover regions S formed of the lower frame 103c (lower side mold 106) and the upper side molds 105. That is to say, the upper side molds 105 become cover members which function to block the end portions of the fluorescent lamps 104 from the light emitting portions 104b with the blocking plates 105a. In addition, power is supplied to the electrode portions 104a of the fluorescent tubes 104 from a power supplying portion, not shown, in the cover regions, so that the light emitting portions 104b emit light.

As described above, electrode holders 103e are provided in cover regions S, and thus, the blocking plates 105a (upper side molds 105) function to block the electrode holders 103e from the diffusion region D. That is to say, the electrode holders 103e cannot be seen through the display area of the liquid crystal display device 1 (see FIG. 1).

Furthermore, the cover regions S are provided with the lower side mold 106, and electrode holders 103e are secured to the lower side mold 106. The lower side mold 106 is a member provided in the cover regions S so as to cover the inner surface of the lower frame 103c, and an insulating member which functions to electrically isolate the electrode portions 104a of the fluorescent tubes 104 from the lower frame 103c. Therefore, the lower side mold 106 is formed of a material having excellent insulating properties, such as a resin.

It is necessary to reduce the thickness of the liquid crystal display device 1 according to the first embodiment (see FIG. 1) in the direction from the front to the rear, and therefore, it is necessary to reduce the thickness of the light source unit 103a. In addition, as shown in FIG. 5, the locking plates 105a of the upper side molds 105 are formed so as to incline from the end portion of the upper surface portions 105b toward the bottom 103d of the lower frame 103c in order to secure both cover regions S having a sufficient size for containing the electrode holders 103e and a large diffusion region D.

The thus formed upper side molds 105 block the end portions (electrode portions 104a) of the fluorescent tubes 104 from the light emitting portion 104b in the configuration, and as described above, the light source unit 103a is thin, and therefore, a portion of the electrode portions 104a made of a conductor, such as a metal, appears in the diffusion region D in the case where EEFL's are used as the fluorescent tubes 104, as shown in FIG. 5.

In addition, the electrode portions 104a do not emit light, and therefore, the diffusion region D in the vicinity of the end portions is not illuminated.

In the case where the light source unit 103a is thick, as in the prior art, and a sufficient distance is secured between the fluorescent tubes 104 and the opening for illumination Do (see FIG. 4), the opening for illumination Do in the vicinity of the end portions is illuminated with scattered light in the diffusion region D of the lower frame 103c, so that the brightness of the backlight device 103 (see FIG. 1) becomes uniform. In addition, the area in the vicinity of the end portions of the liquid crystal panel 120 (see FIG. 1) is also illuminated. In the case of a thin light source unit 103a, however, the lower frame 103c is also thin, and the distance between the fluorescent tubes 104 and the opening for illumination Do becomes short. When the distance between the fluorescent tubes 104 and the opening for illumination Do is short, light emitted by the fluorescent tubes 104 does not sufficiently diffuse, and light does not sufficiently diffuse and is not reflected from the optical sheets 134 (see FIG. 1). Accordingly, the brightness of the backlight device 103 is not uniform, and the brightness in the two end portions lowers. In addition, the liquid crystal panel 120 is not illuminated in the vicinity of the end portions.

Here, FIG. 5 shows the left end portion of the light source unit 103a, and the right end portion has the same structure, and therefore, the light source unit 103a is not illuminated in the two end portions, and the distribution in the brightness of the backlight device 103 is such that the brightness at the two ends, left and right, is low.

When the liquid crystal panel 120 (see FIG. 1) is illuminated with a backlight device 103 having a low brightness at the two ends, left and right, as described above, the displayed image becomes dark at the two ends, left and right, and there is an area in band form where the brightness is inconsistent, and the viewer of the liquid crystal display device 1 (see FIG. 1) feels discomfort.

Therefore, in the first embodiment, the form of the diffusing plate 103b and the optical sheets 134 shown in FIG. 1 is changed when the optical member 135 is formed, so that the area in the vicinity of the end portions of the opening for illumination Do (see FIG. 4) and the area on the center portion side have different reflection properties in the configuration. In addition, the configuration is characterized in that the area in band form where the brightness is inconsistent is smaller at the two ends, left and right, of the liquid crystal panel 120 (see FIG. 1).

Figure 6A:
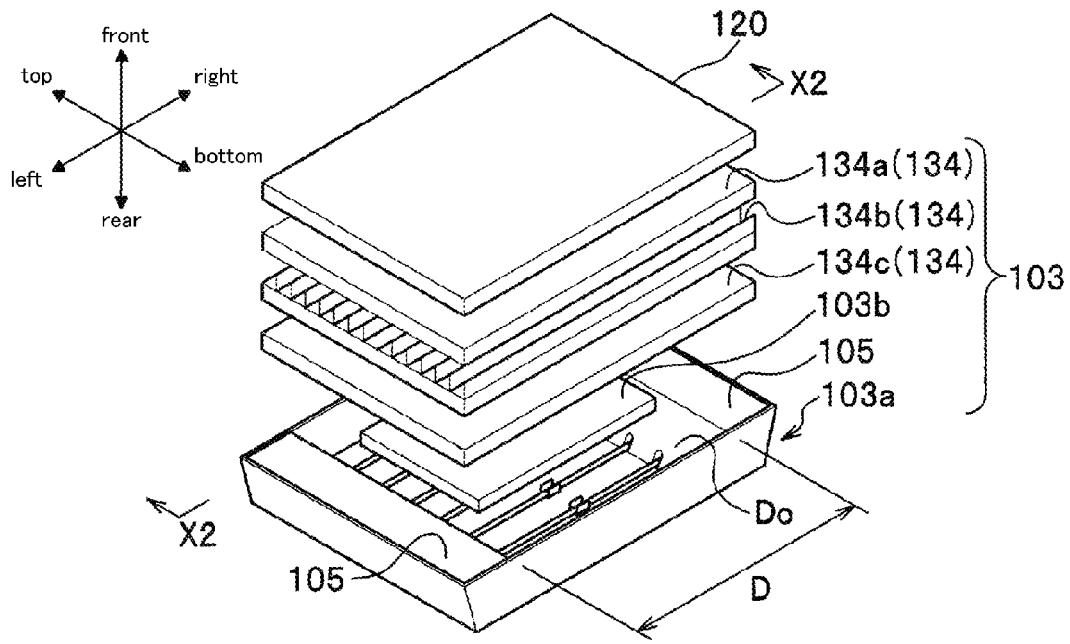
FIG. 6(a) is a diagram showing the unit when provided with a diffusion plate which is smaller than the opening for illumination.
Figure 6B:
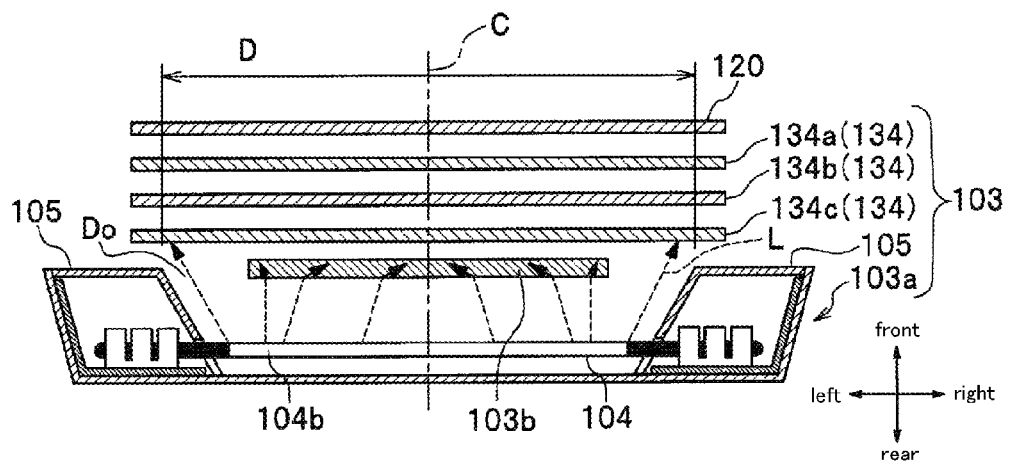
FIG. 6(b) is a cross sectional diagram along X2-X2 in FIG. 6(a)
Figure 6C:
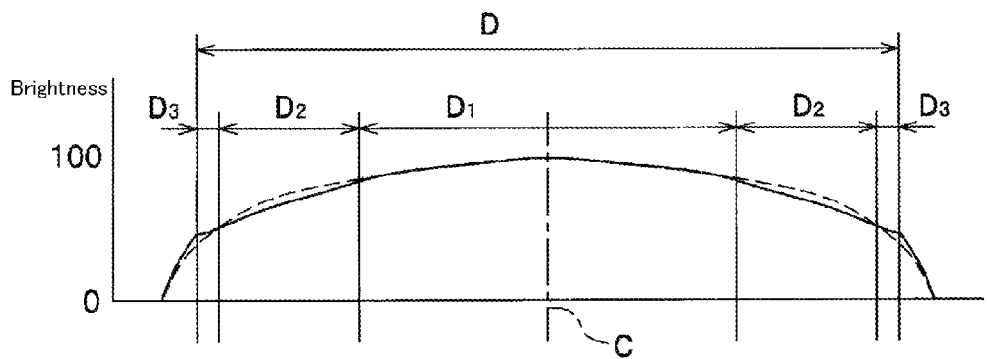
FIG. 6(c) is a graph showing the distribution in the brightness of the backlight device.

FIG. 6(a) is a diagram showing how the unit is provided with a diffusion plate which is smaller than the opening for illumination, FIG. 6(b) is a cross sectional diagram along X2-X2 in FIG. 6(a), and FIG. 6(c) is a graph showing the distribution in the brightness of the backlight display, where the solid line shows the distribution in the brightness in the first embodiment and the broken line shows the distribution in the brightness according to the prior art.

As shown in FIG. 6(a), in the first embodiment, a diffusion plate 103b which is shorter than the opening for illumination Do in the diffusion region D in one or both of the left-right direction and the up-down direction is provided. That is to say, the diffusion plate 103b is not provided in the vicinity of the end portions of the opening for illumination Do in the configuration.

In the case where the diffusion plate 103b is shorter than the opening for illumination Do in the left-right direction, for example, as shown in FIG. 6(b), light L emitted from the light emitting portion 104b of the light fluorescent tubes 104 (see FIG. 5) in the vicinity of the end portions toward the diffusion sheet 134c in the vicinity of the end portions reaches the diffusion sheet 134c without passing through the diffusion plate 103b.

Meanwhile, light L emitted from the center portion of the light emitting portion 104b and light L emitted from the light emitting portion 104b in the vicinity of the end portions toward the left-right center C enters the diffusion plate 103b, and diffuses and is reflected so as to return in the direction toward the bottom 103d. In addition, most light is reflected from the bottom 103b and reenters the diffusion plate 103b but some light is lost when reflected from the bottom 103d and absorption as this process is repeated when light reaches the diffusion 134c.

In this configuration, light L emitted by the fluorescent tubes 104 directly reaches the diffusion sheet 134c in the vicinity of the end portions without passing through the diffusion plate 103b. Accordingly, light L does not diffuse and is not reflected from the diffusion plate 103b, and thus, the ratio of loss is lower than in the vicinity of the center portion when L light reaches the end portion. Meanwhile, light L reaches the center portion of the diffusion sheet 134c while light diffuses and is reflected from the diffusion plate 103b with a higher ratio of loss than in the vicinity of the end portions. Accordingly, light L reaches the diffusion sheet 134c in the vicinity of the end portions with little loss, and light L reaches the vicinity of the center portion with great loss.

Furthermore, in the middle region between the center portion and the end portions of the diffusion plate 103b (for example the regions shown by $D_2$ in FIG. 6(c)), light L generated by the light emitting portion 104b diffuses and is reflected with approximately the same ratio as in the center portion of the diffusion plate 103b so as to return to the bottom 103d side. This light L is again reflected from the bottom 103d toward the diffusion plate 103b, and some of it is directed toward the end portions of the diffusion plate 103b, and light does not diffuse and is not reflected from the diffusion plate 103b in the end portions, and therefore, the end portions are illuminated with some of the light L generated in the middle region between the center portion and the end portions of the light emitting portion 104b. As a result of the above described effects, the transmittance of light L toward the front side increases more in the vicinity of the end portions than in the vicinity of the center portion of the backlight device 103.

As described above, particularly in the case where the fluorescent tubes 104 are the light source, the amount of light emitted in the vicinity of the end portions is small, and therefore, the inclination of the brightness between the center portion and the end portions of the backlight device 103 is mitigated in the present embodiment, and thus, the end portions of the display region in band form where the brightness is inconsistent are not conspicuous.

As described above, the reflection properties are different between the vicinity of the end portions of the opening for illumination Do and the center portion, and therefore, as shown by the solid line in FIG. 6(c), higher brightness than with the reflection properties according to the prior art shown by the broken line can be secured in the vicinity of the end portions of the backlight device 103 (see FIG. 1), and thus, it can be confirmed that excellent effects, such that lack of brightness in the vicinity of the end portions of the backlight device 103 can be reduced, can be gained (regions shown by $D_3$ in figure).

In addition, the brightness in the region shown by $D_2$ in FIG. 6(c) in the first embodiment shown by the solid line is lower than the brightness gained with the reflection properties according to the prior art shown by the broken line.

The diffusion plate 103b is provided so as to cover the entire surface of the opening for illumination Do in the diffusion region D (see FIG. 6(b)) according to the prior art, and therefore, light emitted by the fluorescent tubes 104 (see FIG. 1) gradually increases from in the vicinity of the end portions of the opening for illumination Do toward the left-right center C (see FIG. 4), and the distribution in the brightness in the backlight device 103 is such that the brightness gradually increases toward the left-right center C, as shown by the broken line in FIG. 6(c).

In contrast, the diffusion plate 103b in the first embodiment (see FIG. 6(b)) is provided on the center portion side of the opening for illumination Do in the configuration, and therefore, the end portions of the diffusion plate 103b are in the opening for illumination Do. Light L emitted from the fluorescent tubes 104 toward the outside of the end portions of the diffusion plate 103b does not enter the diffusion plate 103b, and therefore, there is little of the light L enters the end portions of the diffusion plate 103b, and thus, the brightness is lower than the conventional brightness shown by the broken line in locations corresponding to the vicinity of the end portions of the diffusion plate 103b of the backlight device 103.

As described above, the brightness of the backlight device 103 in such a location as to correspond to the vicinity of the end portions of the diffusion plate 103b is lower than the brightness in the conventional distribution in the brightness, and thus, the inclination of the brightness becomes gradual in the vicinity of the end portions of the backlight device 103. As a result, the brightness gradually lowers from the center portion toward the vicinity of the end portions in the liquid crystal panel 120 (see FIG. 6(b)), and thus, the viewer's discomfort can be lessened.

Though FIGS. 6(b) and 6(c) show a cross section and the distribution in the brightness in the left-right direction of the backlight device 103, in the case where diffusion plate 103b is shorter than the opening for illumination Do in the diffusion region D in the up-down direction, the same distribution in the brightness can be observed from the center of the backlight device 103 in the up-down direction toward the vicinity of the upper and lower end portions as in the left-right direction, as shown in FIG. 6(c).

In addition, though FIG. 6(a) shows a mode where the diffusion plate 103b is shorter than the opening for illumination Do in the up-down direction and the left-right direction, the diffusion plate may be shorter than the opening for illumination Do in only the up-down direction or the left-right direction in the configuration.

Furthermore, the diffusion plate may be shorter than the opening for illumination Do in either the up-down direction or the left-right direction in the configuration.

Here, it can be seen that when the vicinity of the end portions of the opening for illumination Do is a region formed with a width of 2 mm to 12 mm from a location corresponding to the end portion of the effective display region Ld (see FIG. 3(a)) of the liquid crystal panel 120, an appropriate distribution can be gained in the brightness of the backlight device 103, and in the first embodiment, the region formed with a width of 2 mm to 12 mm from a location corresponding to the end portion of the effective display region Ld of the liquid crystal panel 120 is in the vicinity of the end portions of the opening for illumination Do.

Here, in the first embodiment, the diffusion plate 103b is smaller than the opening for illumination Do of the diffusion region D, and therefore, the diffusion plate 103b cannot be held by the upper side molds 105 shown in FIG. 1. Therefore, a method for pasting the diffusion plate 103b to the diffusion sheet 134c using a transparent adhesive having the same index of refraction as the diffusion plate 103b, for example, is possible. Alternatively, the fixture member for securing the diffusion plate 103b may be provided in the lower frame 103c in the configuration, but the method for securing the diffusion plate 103b is not limited.

<Modification 1-1>

Figure 7A:
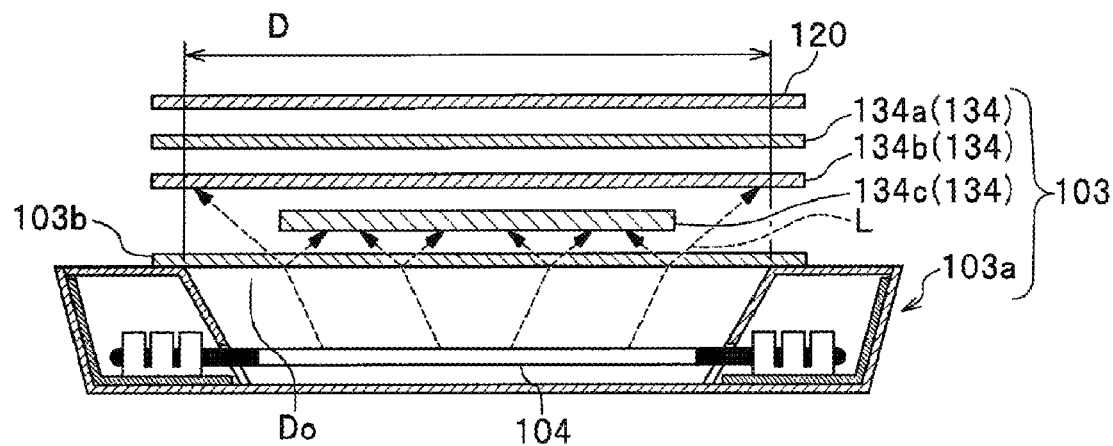
FIG. 7(a) is a diagram showing how the diffusion sheet is smaller than the opening for illumination.
Figure 7B:
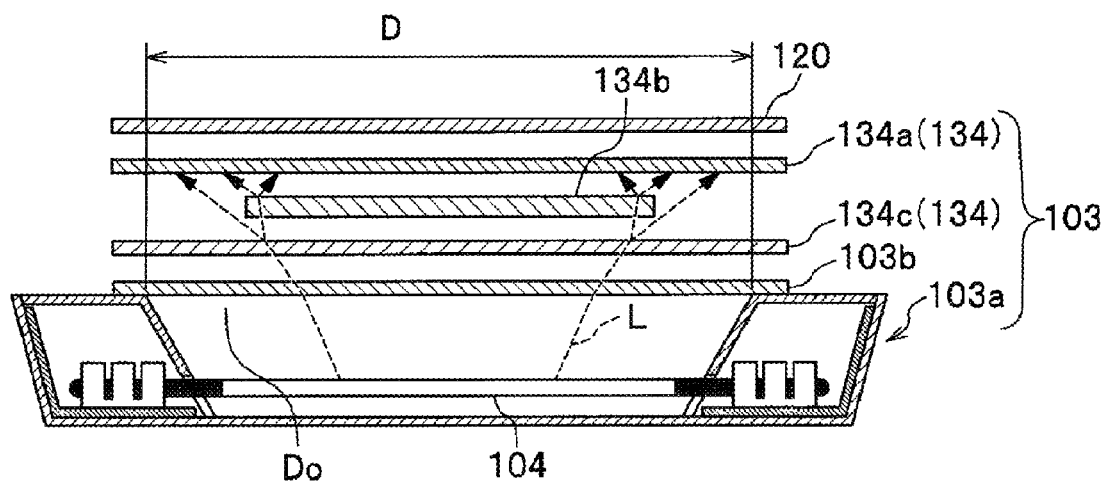
FIG. 7(b) is a diagram showing how the prism sheet is smaller than the opening for illumination.

Next, Modification 1-1 of the first embodiment is described. Though in the first embodiment, the size of the diffusion plate 103b is smaller than the opening for illumination Do of the diffusion region D in the configuration, the same working effects as in the first embodiment can be gained in a configuration where the size of the diffusion sheet 134c or the prism sheet 134b is smaller than the opening for illumination Do. FIG. 7(a) is a diagram showing that the diffusion sheet is smaller than the opening for illumination in the cross section along X2-X2 in FIG. 6(a), and FIG. 7(b) is a diagram showing that the prism sheet is smaller than the opening for illumination in the cross section along X2-X2 in FIG. 6(a). In these configurations, either the diffusion sheet 134c or the prism sheet 134b, or both, are not provided in the vicinity of the end portion of the opening for illumination Do.

Here, making something smaller than the opening for illumination Do in the diffusion region D means that at least the length in the left-right direction or the length in the up-down direction is made shorter than the opening for illumination Do.

In the case where either the diffusion sheet 134c or the prism sheet 134b, or both, are made smaller than the opening for illumination Do in the diffusion region D, light L emitted by the fluorescent tubes 104 which reaches the vicinity of the end portion of the opening for illumination Do, that is to say, the vicinity of the end portion of the liquid crystal panel 120, diffuses little, due to the small number of optical sheets 134 through which light transmits, and thus, reduction in the brightness is small (the prism sheet 134b particularly reflects light that enters through the front, due to its prism form throughout the entire surface). That is to say, the optical member 135 is formed so as to have different reflection properties between the vicinity of the end portion of the opening for illumination Do and the center portion.

When the center portion and the vicinity of the end portions of the opening for illumination Do are compared, the amount of light which reaches the center portion is greater, as described above, and therefore, the center portion becomes brighter. When bright light reaches the vicinity of the end portions as described above, there is less lack of brightness in the vicinity of the end portions of the opening for illumination Do, that is to say, in the vicinity of the end portions of the backlight device 103. As a result, the same effects can be gained as in the case where the size of the diffusion plate 103b is smaller than the opening for illumination Do of the diffusion region D.

Here, as the optical sheets 134 which are smaller than the opening for illumination Do, either the diffusion sheet 134c or the prism sheet 134b may be used, or the diffusion sheet 134c and the prism sheet 134b may both be used.

In addition, the diffusion plate 103b may or may not be smaller than the opening for illumination Do in Modification 1-1.

Here, in Modification 1-1 also, the region formed with a width of 2 mm to 12 mm from a location corresponding to the end portion of the effective display region Ld (see FIG. 3(a)) of the liquid crystal panel 120 is in the vicinity of the end portions of the opening for illumination Do.

<Modification 1-2>

Figure 2A:
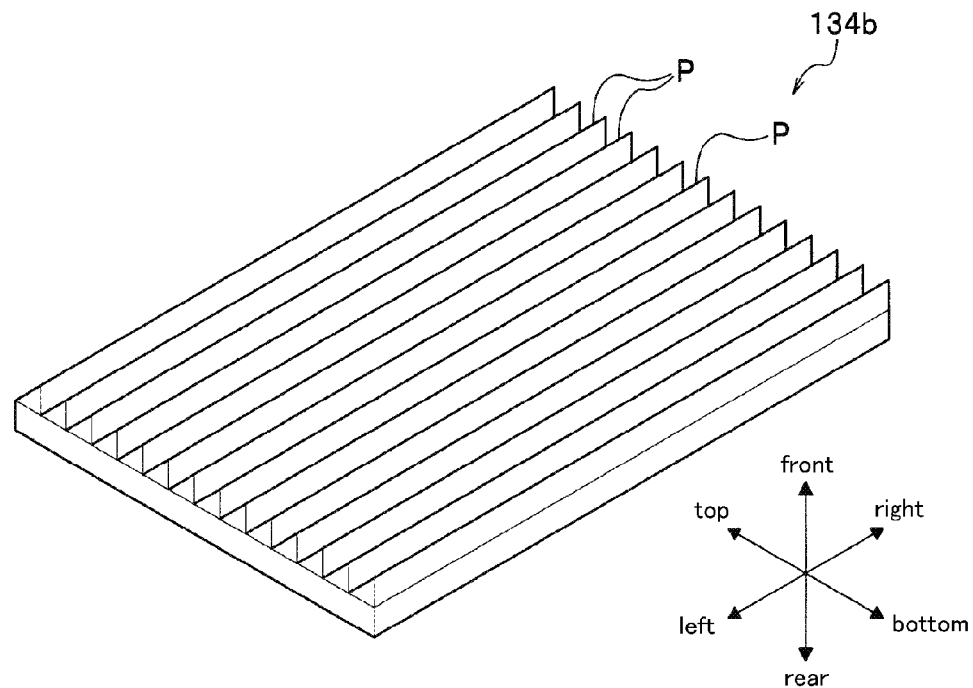
FIG. 2(a) is a schematic diagram showing a prism sheet.

Next, Modification 1-2 of the first embodiment is described. As shown in FIG. 1, in the first embodiment, a prism sheet 134b is provided as the optical sheet 134. As shown in FIG. 2(a), the prism sheet 134b has a prism pattern P in triangular pole form arranged on the front surface parallel to the left-right direction. When the prism sheet is incorporated in the liquid crystal display device 1 (see FIG. 1), it is secured to the light source unit 103a (see FIG. 1) so that the prism pattern P becomes parallel to the fluorescent tubes 104 (see FIG. 1) so as to function to reflect light L emitted from the fluorescent tube 104 and entering through the front surface and collect light entering diagonally in the direction toward the front.

Figure 8A:
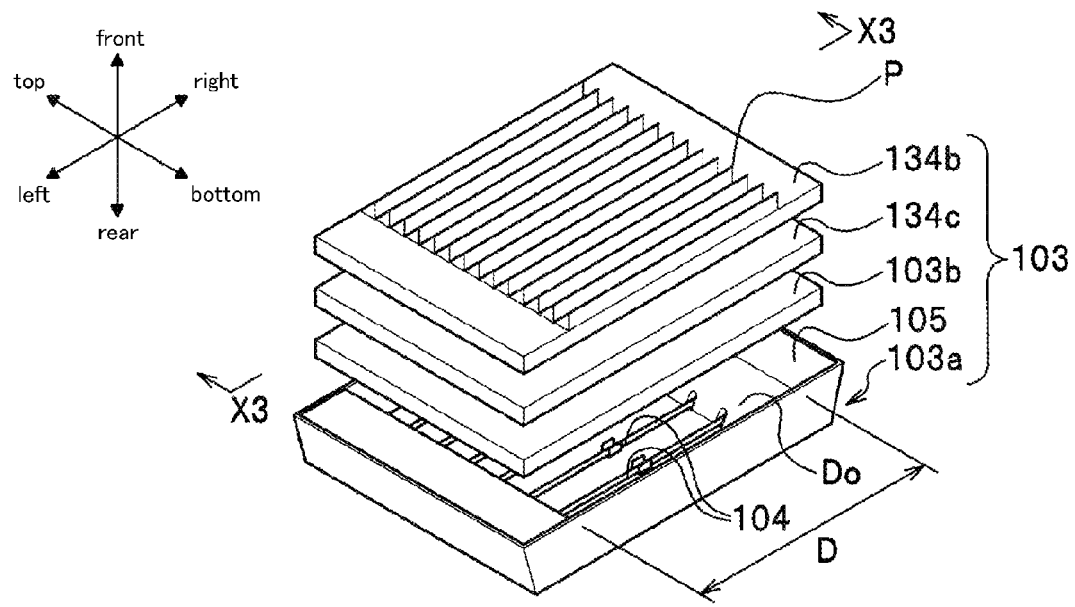
FIG. 8(a) is a diagram showing a prism sheet where a prism pattern is formed in the enter portion.
Figure 8B:
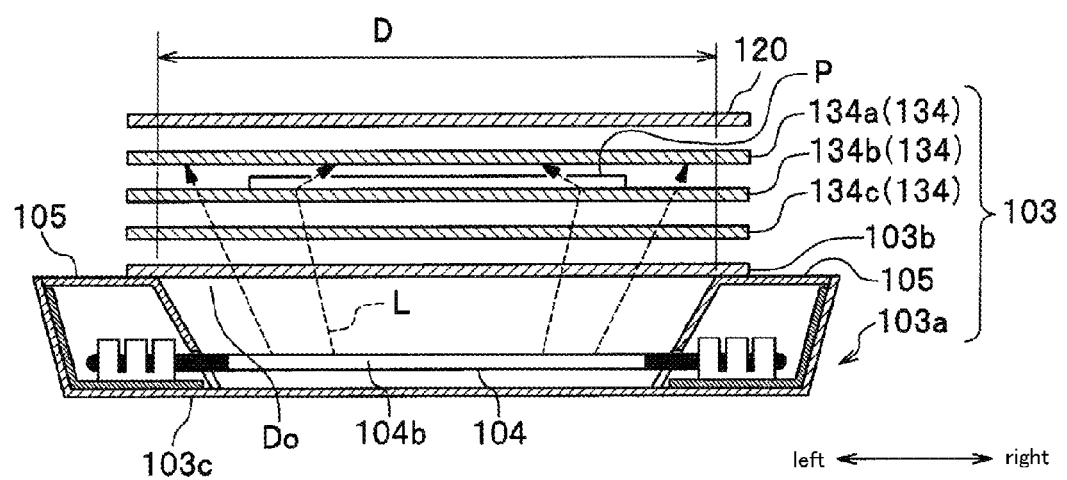
FIG. 8(b) is a cross sectional diagram along X3-X3 in FIG. 8(a)
Figure 8C:
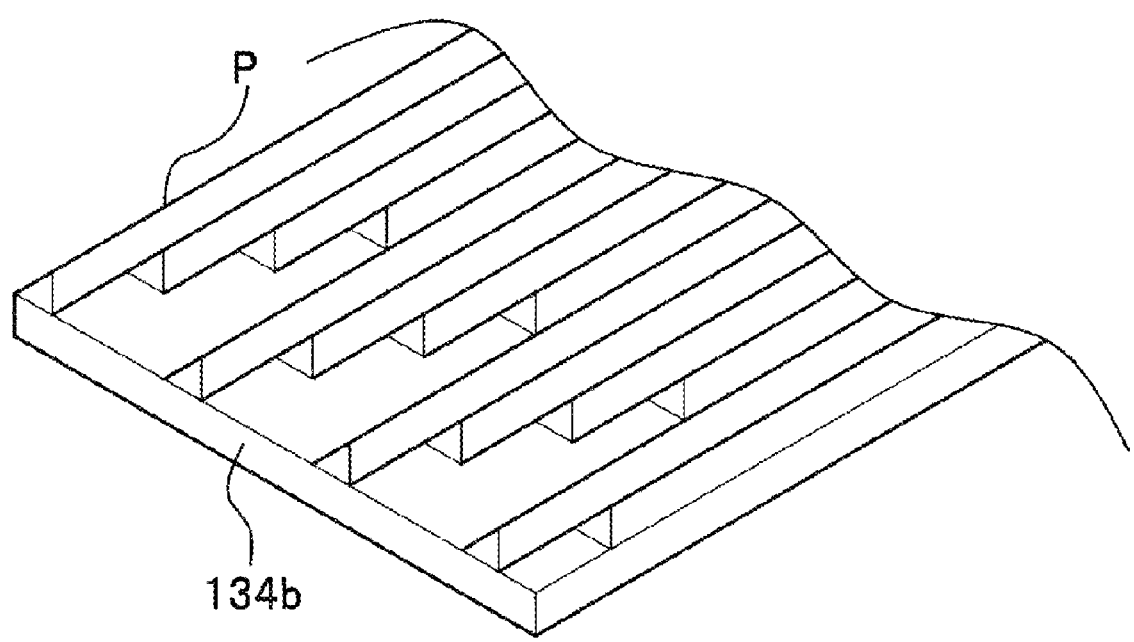
FIG. 8(c) is a diagram showing a prism pattern where the density is lower in the vicinity of the end portions.

In Modification 1-2, the length of the prism pattern P in the left-right direction is shorter than the opening for illumination Do in the diffusion region D (see FIG. 8(b)). FIG. 8(a) is a diagram showing a prism sheet where the prism pattern is formed in the center portion, FIG. 8(b) is a cross sectional diagram along X3-X3 in FIG. 8(a), and FIG. 8(c) is a diagram showing a prism pattern of which the density is lower in the vicinity of the end portions.

As shown in FIG. 8(a), in the prism sheet 134b in Modification 1-2, the prism pattern P is formed only in the center portion in the left-right direction. In addition, as shown in FIG. 8(b), the prism sheet 134b is provided so that the prism pattern P is arranged in the center portion of the opening for illumination Do. That is to say, no prism pattern P is formed in locations corresponding to the vicinity of the end portions of the opening for illumination Do.

Here, though FIG. 8(a) shows a configuration where no prism pattern P is formed at the two ends, left and right, of the prism sheet 134b, the configuration may be such that the prism pattern P is not formed at the top and bottom. Furthermore, the configuration may be such that no prism pattern P is formed at the two ends, left and right, or at the top and bottom.

As described above, the prism sheet 134b reflects light L emitted by the fluorescent tubes 104 due to the prism pattern P, and in the case where no prism pattern P is formed in the vicinity of the end portions of the prism sheet 134b, light L that reaches the vicinity of the end portions of the prism sheet 134b has little reflected components. The vicinity of the end portions of the prism sheet 134b corresponds to the vicinity of the end portions of the opening for illumination Do in the configuration, and therefore, the reflection properties are different between the vicinity of the end portions and the center portion of the opening for illumination Do.

When light L is reflected from the prism pattern P, the loss becomes great, as described above, and the brightness lowers and the image becomes dark, and therefore, there is a difference in brightness between light L reflected from the prism pattern P and light L which is not reflected.

The vicinity of the end portions of the prism sheet 134b where no prism pattern is formed is provided in the vicinity of the end portions of the opening for illumination Do, and therefore, light which is brighter than in the center portion reaches the vicinity of the end portions of the opening for illumination Do. When the center portion and the vicinity of the end portions in the opening for illumination Do are compared, the amount of light which reaches the center portion is greater, and thus, the image becomes brighter in the center portion, but bright light also reaches the vicinity of the end portions. Accordingly, there is less lack of brightness in the vicinity of the end portions of the opening for illumination Do, that is to say, in the vicinity of the end portions of the backlight device 103. As a result, the same effects can be gained as in the case where the size of the diffusion plate 103b is smaller than the opening for illumination Do in the diffusion region D.

Furthermore, in the case of Modification 1-2, the size of the prism sheet 134b is the same as the size of the diffusion sheet 134c and the reflection polarizing plate 134a, and therefore, excellent effects can be gained, such that the prism pattern P can be provided in the center portion of the opening for illumination Do, even when the arrangement is not precise when the liquid crystal display device 1 is assembled (see FIG. 1).

In addition, though FIG. 8(a) shows a configuration where the prism pattern P is not formed in the vicinity of the end portions of the prism sheet 134b, the prism pattern P may be formed so that the density gradually becomes lower from the center portion of the prism sheet 134b toward the vicinity of the end portions, for example.

This can be achieved as shown in FIG. 8(c), for example. The density can be gradually lowered by forming the prism pattern P in such a manner that the interval between prisms becomes larger toward the vicinity of the end portions of the prism sheet 134b.

In this configuration, the reflection properties of the prism pattern P change smoothly toward the vicinity of the end portions of the prism sheet 134b, that is to say, the vicinity of the end portions of the opening for illumination Do, and thus, the distribution in the brightness of the backlight device 103 also changes smoothly toward the vicinity of the end portions.

Accordingly, images displayed on the liquid crystal panel 120 change smoothly, so that a natural image can be provided to the viewer.

Here, in Modification 1-2 also, the region formed with a width of 2 mm to 12 mm from a location corresponding to the end portion of the effective display region Ld (see FIG. 3(*a*)) of the liquid crystal panel 120 is in the vicinity of the end portions of the opening for illumination Do.

<Modification 1-3>

Figure 9A:
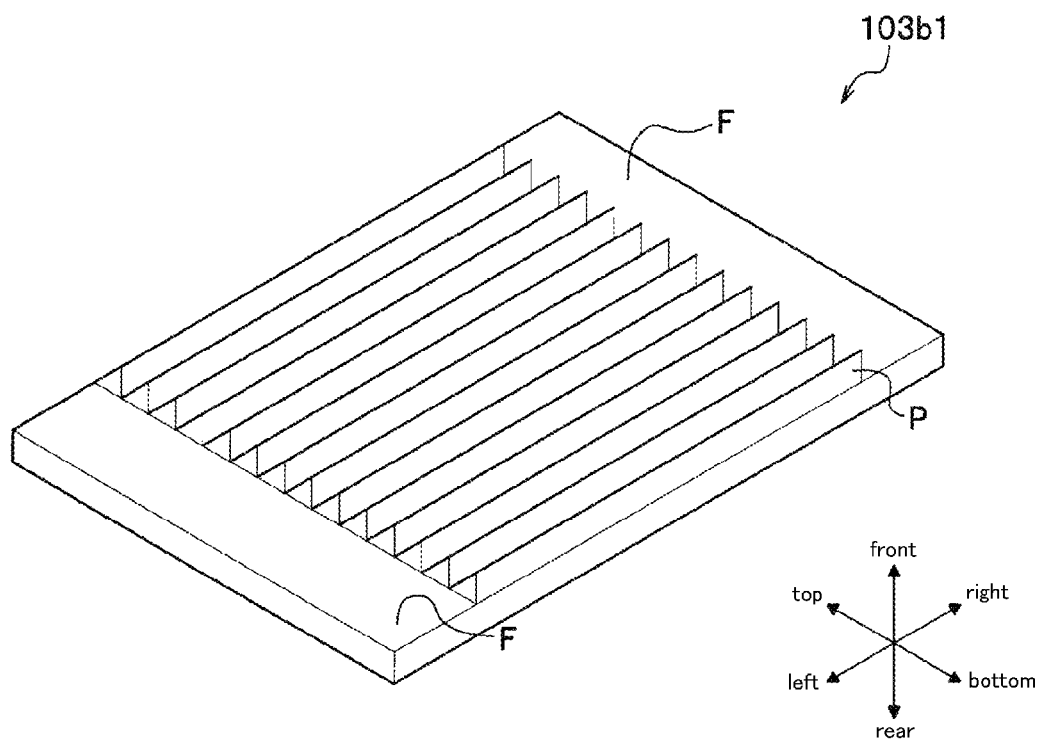
FIG. 9(a) is a diagram showing a diffusion plate with prisms.
Figure 9B:
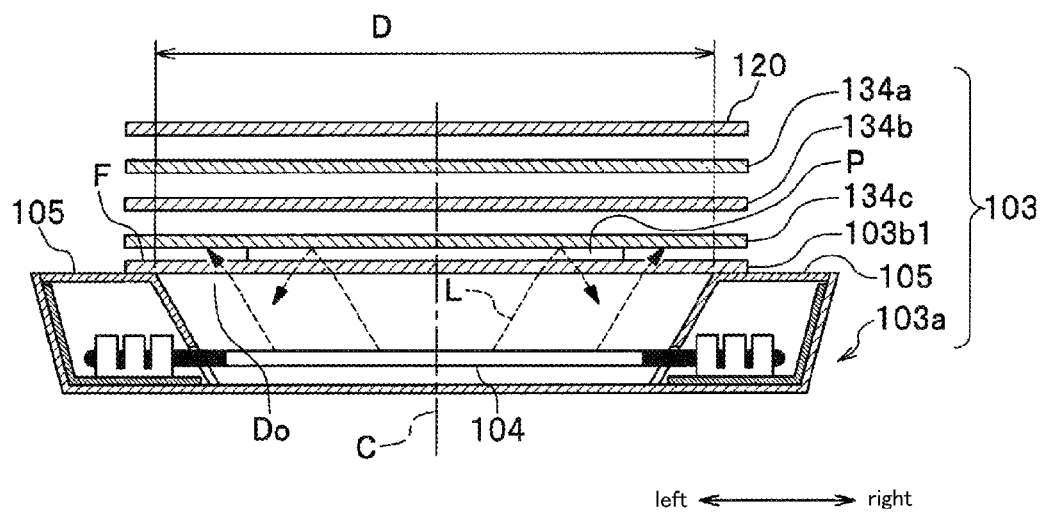
FIG. 9(*b*) is a cross sectional diagram along X2-X2 in FIG. 6(*a*) when the unit is provided with a diffusion plate with prisms.

Next, Modification 1-3 of the first embodiment is described. FIG. 9(*a*) is a diagram showing a diffusion plate with prisms, and FIG. 9(*b*) is a cross sectional diagram along X2-X2 in FIG. 6(*a*) showing a unit having a diffusion plate with prisms. As shown in FIG. 9(*b*), Modification 1-3 is provided with a diffusion plate with prisms 103*b*1 having a prism pattern on the front surface as a diffusion plate 103*b*.

As shown in FIG. 9(*a*), the prism pattern P in triangular pole form is provided on the front surface so as to be parallel to the left-right direction in the diffusion plate with prisms 103*b*1. In addition, as shown in FIG. 9(*b*), the diffusion plate is secured to the light source unit 103*a* so that the prism pattern P becomes parallel to the fluorescent tubes 104, and functions to reflect light emitted by the fluorescent tubes 104.

Furthermore, Modification 1-3 is characterized in that no prism pattern P is formed in the vicinity of the end portions of the diffusion plate with prisms 103*b*1, as shown in FIG. 9(*a*). That is to say, a plane portion F where no prism pattern P is formed is provided in the vicinity of the end portions of the diffusion plate with prisms 103*b*1. In addition, the vicinity of the end portions of the diffusion plate with prisms 103*b*1 corresponds to the vicinity of the end portions of the opening for illumination Do in the configuration, and therefore, as shown in FIG. 9(*b*), no prism pattern P is formed in locations corresponding to the vicinity of the end portions of the opening for illumination Do.

As described above, the diffusion plate with prisms 103*b*1 allows the prism pattern P to reflect light L emitted by the fluorescent tubes 104 in the up-down direction (see FIG. 9(*a*)), while light reaching the vicinity of the end portions of the diffusion plate with prisms 103*b*1 is not reflected from the plane portion F.

When light L is reflected from the prism pattern P, the loss becomes great, the brightness lowers and the image becomes dark. Accordingly, there is a difference in brightness between light L reflected from the prism pattern P and light L which is not reflected.

Here, though in FIG. 9(*a*), the plane portion F is formed at the two ends, left and right, of the diffusion plate with prisms 103*b*1, it may be formed at the top and bottom in the configuration. Furthermore, the plane portion F may be formed at the two ends, left and right, and at the top and bottom in the configuration.

The plane portion F where no prism pattern P is formed is provided in the vicinity of the end portions of the opening for illumination Do, and therefore, light which is brighter than in the center portion reaches the vicinity of the end portions of the opening for illumination Do. That is to say, the optical member 135 is formed so that the reflection properties are different between the vicinity of the end portions of the opening for illumination Do and the center portion.

When the center portion and the vicinity of the end portions in the opening for illumination Do are compared, the amount of light which reaches the center portion is greater, and therefore, the center portion is brighter, but bright light reaches the vicinity of the end portions, so that there is less lack of brightness in the vicinity of the end portions of the opening for illumination Do, that is to say, in the vicinity of the end portions of the backlight device 103. As a result, the same effects can be gained as in the case where the size of the diffusion plate 103*b* is smaller than the opening for illumination Do in the diffusion region D.

In addition, though FIG. 9(*a*) shows a configuration where no prism pattern is formed in the vicinity of the end portions of the diffusion plate with prisms 103*b*1, the diffusion plate may be formed so that the density of the prism pattern P gradually becomes lower from the center portion of the diffusion plate with prisms 103*b*1 toward the vicinity of the end portions, for example.

This can be achieved in the same manner as in the prism sheet 134*b* shown in FIG. 8(*c*), for example. The density can be gradually lowered by forming the prism pattern P in such a manner that the interval in the pattern becomes larger toward the vicinity of the end portions.

In this configuration, the reflection properties of the prism pattern P change smoothly toward the vicinity of the end portions of the diffusion plate with prisms 134*b*1, and thus, the reflection properties of the opening for illumination Do changes smoothly from the center portion toward the vicinity of the end portions, and the brightness of the backlight device 103 also changes smoothly toward the vicinity of the end portions.

Accordingly, images displayed on the liquid crystal panel 120 change smoothly, so that a natural image can be provided to the viewer.

Here, Modification 1-3 is provided with a diffusion plate with prisms 103*b*1, and therefore, it is not necessary to provide a prism sheet 134*b*.

In addition, in Modification 1-3 also, the region formed with a width of 2 mm to 12 mm from a location corresponding to the end portion of the effective display region LD (see FIG. 3(*a*)) of the liquid crystal panel 120 is in the vicinity of the end portion of the opening for illumination Do.

<Modification 1-4>

Figure 10:
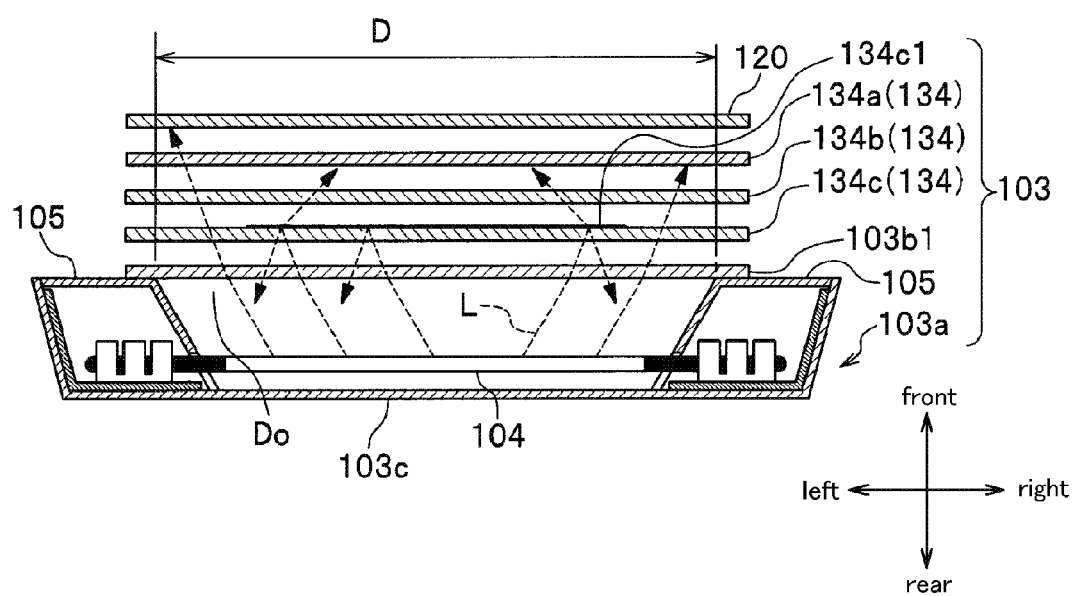
FIG. 10 is a cross sectional diagram along X2-X2 in FIG. 6(*a*) showing a modification 1-4.

Next, Modification 1-4 of the first embodiment is described. FIG. 10 is a cross sectional diagram along X2-X2 in FIG. 6(*a*) showing Modification 1-4. As shown in FIG. 10, Modification 1-4 is characterized in that the length of the diffusion portion 134*c*1 formed in the diffusion sheet 134*c* in the left-right direction is shorter than the opening for illumination Do in the diffusion region D.

As described above, the diffusion sheet 134*c* functions to diffuse light L emitted by the fluorescent tubes 104 and entering from the rear in the diffusion portion 134*c*1 formed on the front surface. At this time, when the length of the diffusion portion 134*c*1 in the left-right direction is shorter than the opening for illumination Do, light L emitted by the fluorescent tubes 104 does not diffuse in the diffusion portion 134*c*1 in the vicinity of the end portions of the opening for illumination Do. That is to say, the reflection properties are different between the vicinity of the end portions and the center portion of the opening for illumination Do.

Light L which diffuses in the diffusion portion 134*c*1 diffuses much, and the brightness lowers, and therefore, light L of which the brightness does not lower reaches the vicinity of the end portions of the opening for illumination Do where there are no diffusion portions 134*c*1.

When the center portion and the vicinity of the end portions in the opening for illumination Do are compared, the amount of light which reaches the center portion is greater, and therefore, the center portion becomes brighter, but bright light also reaches the vicinity of the end portions, so that there is less lack of brightness in the vicinity of the end portions of the opening for illumination Do, that is to say, in the vicinity of the end portions of the backlight device 103. Accordingly, the same effects can be gained as in the case where the size of the diffusion plate 103b is smaller than the opening for illumination Do in the diffusion region D.

In addition, in the border portion in the diffusion sheet 134c in Modification 1-4 between where the diffusion portion 134c1 is formed and where it is not formed, the density of diffusion particles, not shown, made of microscopic particles, for example, may smoothly change in the diffusion portion 134c1 so that the density gradually becomes lower from the center portion toward the vicinity of the end portions.

Here, the density of the diffusion particles is determined by the number of diffusion particles per unit area.

In this configuration, the size of the diffusion portion 134c1 where light L diffuses gradually becomes smaller from the center portion of the diffusion sheet 134c toward the vicinity of the end portions. That is to say, the reflection properties of the diffusion sheet 134c smoothly change, and thus, the reflection properties of the opening for illumination Do smoothly change from the center portion toward the vicinity of the end portions, and the brightness of the backlight device 103 also changes smoothly.

Accordingly, images displayed on the liquid crystal panel 120 change smoothly, so that a natural image can be provided to the viewer.

Here, in the case where all of the optical sheets 134 are diffusion sheets 134c, the length of the diffusion portion 134c1 may be shorter than the opening for illumination Do in the diffusion region D in one diffusion sheet 134c in the left-right direction in the configuration, or the length of the diffusion portion 134c1 in the left-right direction may be shorter than the opening for illumination Do in the diffusion region D in all of the diffusion sheets 134c in the configuration. Furthermore, a diffusion sheet 134c where the length of the diffusion portion 134c1 in the left-right direction is shorter than the opening for illumination Do and a diffusion sheet 134c where the length of the diffusion portion 134c1 in the left-right direction is not shorter may be mixed in the configuration.

Figure 2B:
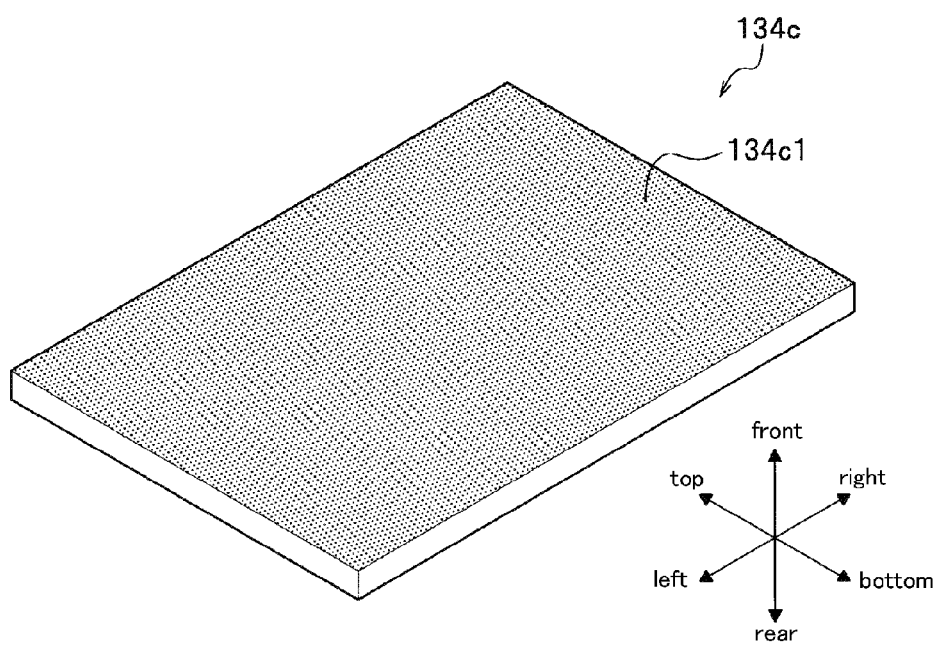
FIG. 2(b) is a diagram showing a diffusion sheet.

In addition, the length of the diffusion portion 134c1 may be shorter than the opening for illumination Do in the up-down direction in the configuration, as in FIG. 2(b), or both in the left-right direction and in the up-down direction in the configuration.

In addition, in Modification 1-4 also, the region formed with a width of 2 mm to 12 mm from a location corresponding to the end portion of the effective display region Ld (see FIG. 3(a)) of the liquid crystal panel 120 is in the vicinity of the end portion of the opening for illumination Do.

Second Embodiment

Figure 11A:
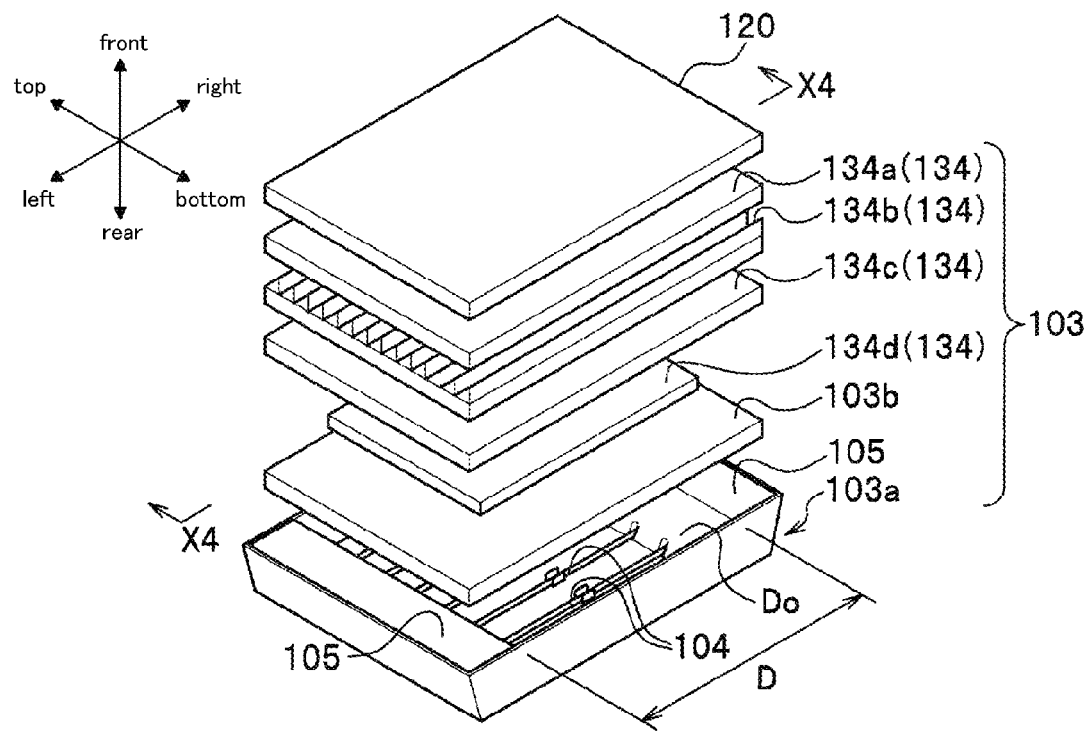
FIG. 11(*a*) is a diagram showing the configuration of an optical sheet and a backlight device according to the second embodiment.

Next, the second embodiment of the present invention is described. FIG. 11(a) is a diagram showing the configuration of the optical sheet and the backlight device according to the second embodiment.

As shown in FIG. 11(a), in the second embodiment, there are four optical sheets 134 in the configuration, where a slightly reflective member 134d is provided between the diffusion sheet 134c and the diffusion plate 103b.

The slightly reflective member 134d is a sheet made of a transparent material having a different index of refraction from the diffusion plate 103b, and a PET (polyethylene terephthalate) film can be used, for example.

The slightly reflective member 134d functions to reflect part of the light emitted from the diffusion plate 103b and transmit the rest, and the reflected light repeats multiple reflections from the diffusion plate 103b and is emitted through the diffusion sheet 134c.

In addition, the second embodiment is characterized in that the slightly reflective member 134d is smaller than the opening for illumination Do in the diffusion region D. That is to say, the slightly reflective member 134d is shorter than the opening for illumination Do in at least one direction: the left-right direction or the up-down direction, in the configuration. In this configuration, the slightly reflective member 134d is not provided in the vicinity of the end portions of the opening for illumination Do.

Figure 11B:
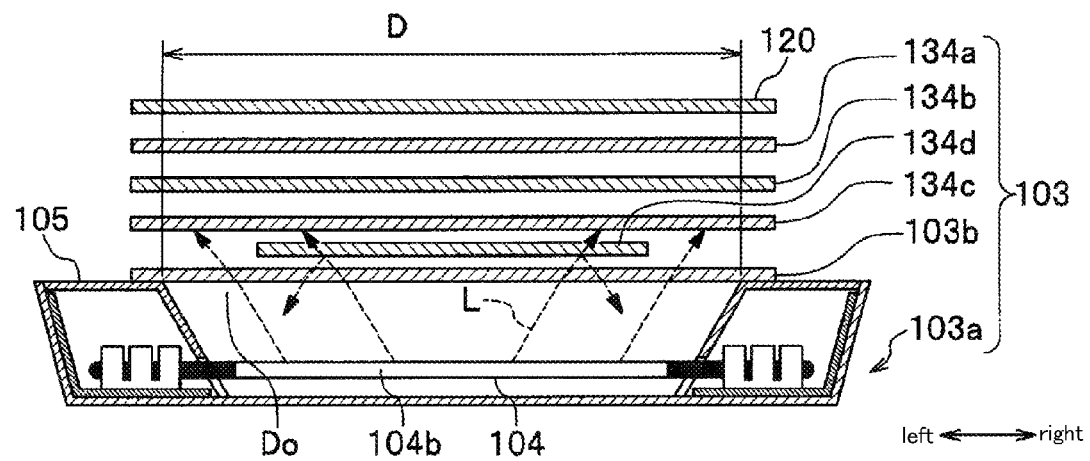
Figure 11C:
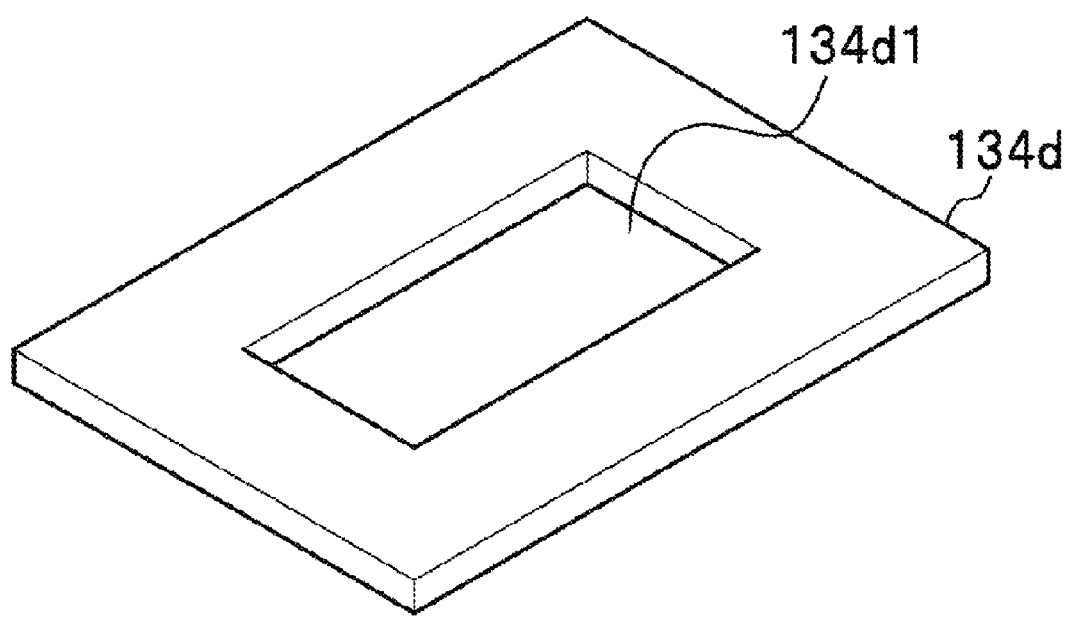

FIG. 11(b) is a cross sectional diagram along X4-X4 in FIG. 11(a), and FIG. 11(c) is a diagram showing a slightly reflective member having an opening at the center.

As shown in FIG. 11(b), in the case where a slightly reflective member 134d of which the length from left to right is shorter than the opening for illumination Do in the diffusion region D is placed on the center portion side of the opening for illumination Do, for example, part of the light L emitted from the fluorescent tubes 104 is reflected from the slightly reflective member 134d toward the fluorescent tubes 104 in the opening for illumination Do having the slightly reflective member 134d on the center portion side, and therefore, there is less light L which reaches the diffusion sheet 134c.

Meanwhile, there is no slightly reflective member 134d in the vicinity of the end portions of the opening for illumination Do, and therefore, light L emitted by the fluorescent tubes 104 reaches the vicinity of the end portions without being reflected from any slightly reflective member 134d. That is to say, the reflection properties are different between in the vicinity of the end portions and the center portion of the opening for illumination Do.

As a result, the amount of light L which reaches the vicinity of the end portions of the opening for illumination do, that is to say, in the vicinity of the end portions of the backlight device 103, increases, and there is less lack of brightness in the vicinity of the end portions of the backlight device 103. Accordingly, the same effects can be gained as in the first embodiment.

Here, the slightly reflective member 134d used in the second embodiment may have such a form that an opening 134d1 is provided in the vicinity of the center portion, as in FIG. 11(c). In this configuration, a slightly reflective member 134d is not provided in the vicinity of the center portion of the opening for illumination Do.

As described above, the slightly reflective member 134d reflects part of the light L emitted by the fluorescent tubes 104 (see FIG. 11(b)) toward the fluorescent tubes 104, and therefore, in the region with the slightly reflective member 134d, the brightness of the backlight device 103 (see FIG. 11(b)) lowers.

In the case where an opening 134d1 is provided in the vicinity of the center portion of the slightly reflective member 134d, as in FIG. 11(c), light L reaches the vicinity of the center portion of the opening for illumination Do (see FIG. 11(b)) without being reflected from the slightly reflective member 134d, and therefore, the slightly reflective member 134d is provided without the brightness lowering in the vicinity of the center portion of the backlight device.

Here, the size of the opening 134d is not limited, and an appropriate size can be set on the basis of the reflection properties required for the optical member 135.

In addition, in the second embodiment also, the region formed with a width of 2 mm to 12 mm from a location corresponding to the end portion of the effective display region Ld (see FIG. 3(a)) of the liquid crystal panel 120 is in the vicinity of the end portion of the opening for illumination Do.

<Modification 2-1>

Figure 12A:
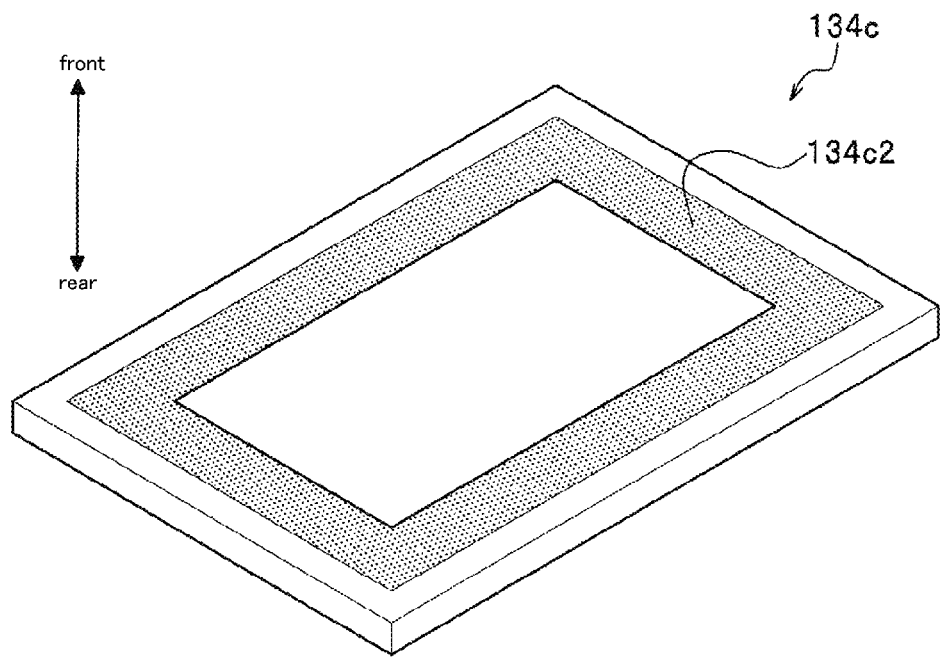
FIG. 12(*a*) is a diagram showing a slightly reflective portion formed on a diffusion sheet.
Figure 12B:
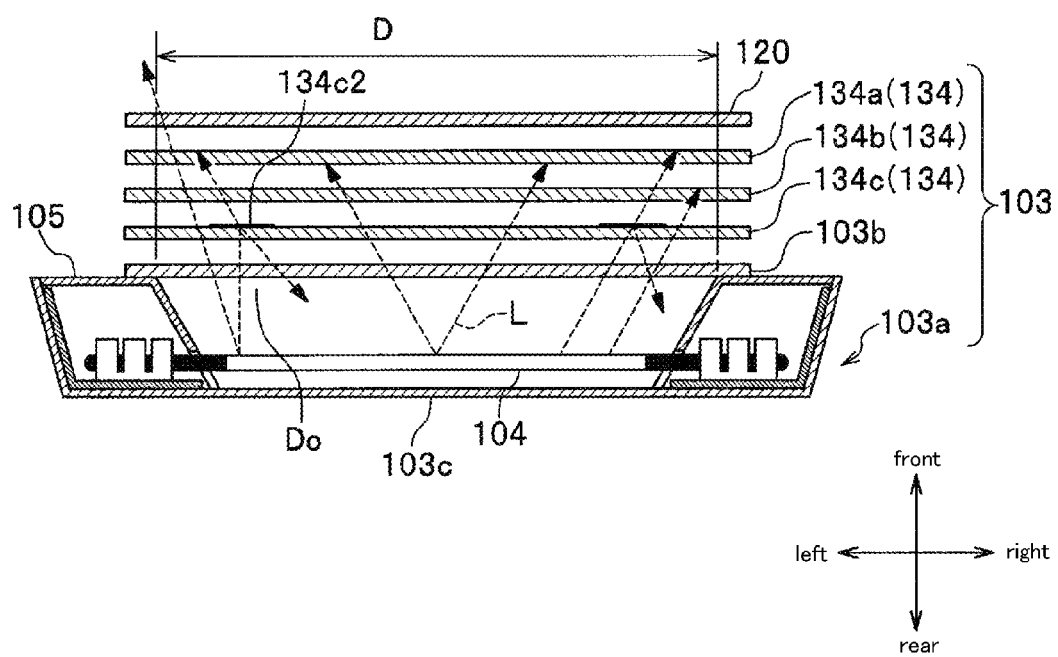

Next, Modification 2-1 of the second embodiment is described. FIG. 12(a) is a diagram showing a slightly reflective portion formed in the diffusion sheet, and FIG. 12(b) is a cross sectional diagram along X4-X4 in FIG. 11(a) showing the configuration of Modification 2-1.

As shown in FIG. 12(a), Modification 2-1 of the second embodiment is not provided with any slightly reflective member 136, but has a configuration where a slightly reflective 134c2 is formed on the front surface of the diffusion sheet 134c. In addition, as shown in FIG. 12(a), the slightly reflective portion 134c2 is not formed in the vicinity of the end portions and in the vicinity of the center portion of the diffusion sheet 134c, and the slightly reflective portion 134c2 is formed as a rectangular frame in the diffusion sheet 134c of which the form on the surface is rectangular. Here, an appropriate size for the center portion of the diffusion sheet 134c where the slightly reflective portion 134c2 is not formed may be set on the basis of the reflection properties required for the optical member 135.

Here, the slightly reflective portion 134c2 may have such a configuration as to be formed on the rear side of the diffusion sheet 134c.

In addition, the end portions of the diffusion sheet 134c are formed so as to correspond to the vicinity of the end portions of the opening for illumination Do, and therefore, a slightly reflective portion 134c is not formed in the outer periphery of the diffusion sheet 134c, and thus, no slightly reflective portion 134c2 is formed in locations corresponding to the vicinity of the end portions of the opening for illumination Do in the configuration.

The slightly reflective portion 134c2 is formed by securing a transparent component having a different index of refraction from the diffusion sheet 134c to the surface of the diffusion sheet 134c, and can be formed by applying a transparent electrode (such as of ZnO) on the surface of the diffusion sheet 134c, for example.

In addition, as shown in FIG. 12(b), the diffusion sheet 134c is secured to the light source unit 103a so that the slightly reflective portion 134c2 is placed inside the opening for illumination Do in the diffusion region D.

The slightly reflective portion 134c2 functions to reflect part of the light emitted from the diffusion plate 103b and transmit the rest, and the reflected light repeats multiple reflection from the diffusion plate 103b and light L is emitted from the front.

When the slightly reflective portion 134c2 is provided as shown in FIG. 12(b), in the portion where the slightly reflective portion 134c2 is provided, part of light L emitted by the fluorescent tubes 104 is reflected from the slightly reflective portion 134c2 toward the fluorescent tubes 104, and therefore, the amount of light which reaches the prism sheet 134b lowers.

Meanwhile, there are no slightly reflective portions 134c2 in the vicinity of the end portions of the opening for illumination Do, and therefore, light L emitted by the fluorescent tubes 104 reaches the prism sheet 134b without being reflected from the slightly reflective portion 134c2. That is to say, the reflection properties are different between the in vicinity of the end portions and the center portion of the opening for illumination Do.

Thus, the amount of light L which reaches the vicinity of the end portions of the opening for illumination Do, that is to say, in the vicinity of the end portions of the backlight device 103, becomes relatively great, and thus, there is little lack of brightness in the vicinity of the end portions of the backlight device 103. Accordingly, the same effects can be gained as in the first embodiment.

Here, in Modification 2-1, the slightly reflective portion 134c2 is not provided in the vicinity of the center portion of the diffusion sheet 134c, as shown in FIG. 12(b), and therefore, light L reaches the vicinity of the center portion of the opening for illumination Do, which corresponds to the vicinity of the center portion of the diffusion sheet 134c, without being reflected from the slightly reflective portion 134c2. As a result, the slightly reflective portion 134c2 can be provided without the brightness lowering in the vicinity of the center portion of the backlight device.

In addition, in Modification 2-1 also, the region formed with a width of 2 mm to 12 mm from a location corresponding to the end portion of the effective display region Ld (see FIG. 3(a)) of the liquid crystal panel 120 is in the vicinity of the end portion of the opening for illumination Do.

<Modification 2-2>

Figure 13A:
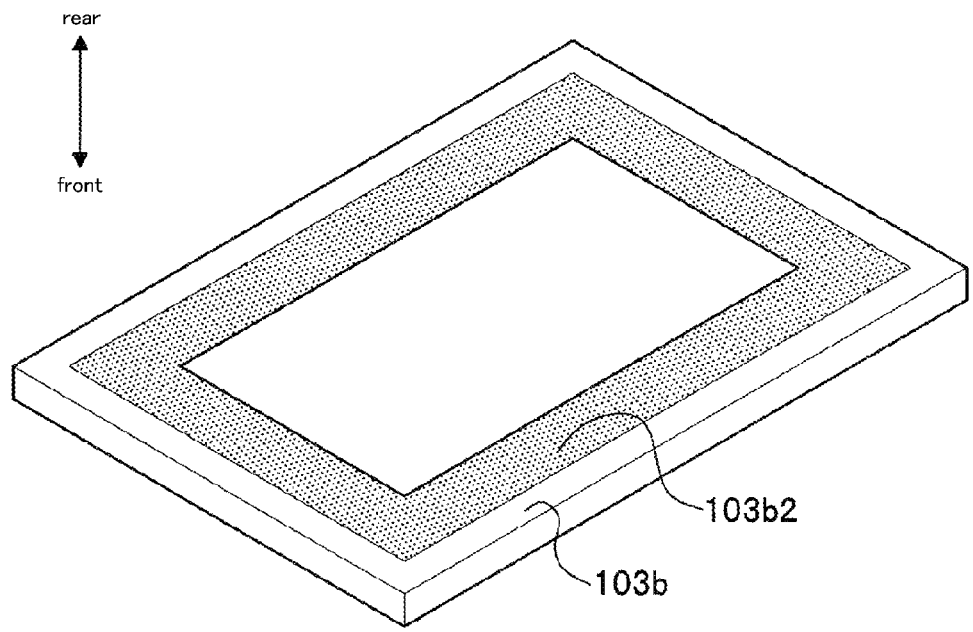
FIG. 13(*a*) is a diagram showing a light curtain formed on the diffusion plate.

Next, Modification 2-2 of the second embodiment is described. FIG. 13(a) is a diagram showing a light curtain formed on the diffusion plate, and FIG. 13(b) is a cross sectional diagram along X4-X4 in FIG. 11 showing the configuration of Modification 2-2.

As shown in FIG. 13(a), in Modification 2-2 of the second embodiment, a light curtain 103b2 is formed on the surface on the rear side of the diffusion plate 103b. In addition, as shown in FIG. 13(a), the light curtain 103b2 is not formed in the vicinity of the end portions and in the vicinity of the center portion of the diffusion plate 103b, and the light curtain 103b2 is formed as a rectangular frame in the diffusion plate 103b, of which the form on the surface is rectangular. As described above, the light curtain 103b2 is not formed in the vicinity of the end portions of the diffusion plate 103b, so that the light curtain 103b2 is not formed in locations corresponding to the vicinity of the end portions of the opening for illumination Do in the configuration. Here, an appropriate size may be set for the diffusion plate 103b in the vicinity of the center portion where the light curtain 103b2 is not formed on the basis of the reflection properties required for the optical member 135.

Figure 13B:
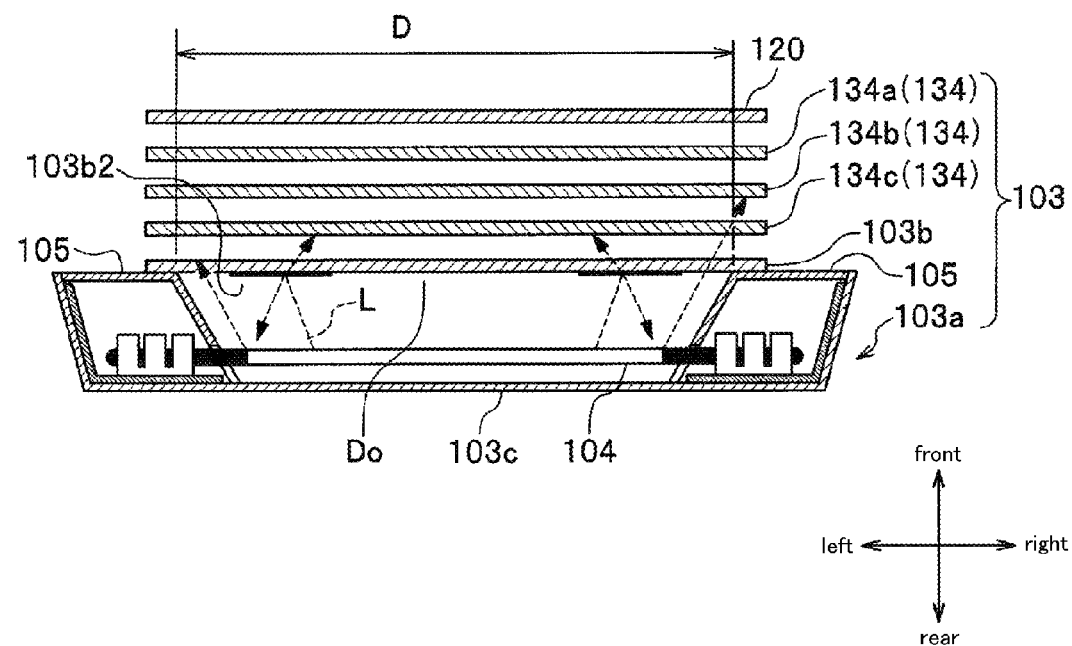

In addition, as shown in FIG. 13(b), the diffusion plate 103b is secured to the light source unit 103a, so that the light curtain 103b2 is placed inside the opening for illumination Do in the diffusion region D.

The light curtain 103b2 is formed by printing a dot pattern made of aluminum, for example, on the surface, and the size and density in the arrangement determine the amount of light transmission. In the case where the density of the printed pattern is high, the amount of light transmission is small, while in the case where the density of the printed pattern is low, the transparent portion becomes large, making the amount of light transmission great. That is to say, the pattern functions as an entrance restricting region for restricting the amount of light which enters into the diffusion plate 103b.

In Modification 2-2, the light curtain 103b2 is not formed in the vicinity of the end portions of the diffusion plate 103b, and thus, light L emitted by the fluorescent tubes 104 can enter in the vicinity of the end portions of the diffusion plate 103b without any restrictions in terms of the amount that enters. Meanwhile, the amount of light L which transmits and enters the diffusion plate 103b is restricted in the region on the center portion side where the light curtain 103b2 is formed, and therefore, the amount of light L which transmits and enters the diffusion plate 103b is reduced. That is to say, the reflection properties are different between in the vicinity of the end portions and the center portion of the diffusion plate 103*b*. In addition, the vicinity of the end portions of the diffusion plate 103*b* corresponds to the vicinity of the end portions of the opening for illumination Do in the configuration, and therefore, the reflection properties are different between in the vicinity of the end portions and the center portion of the opening for illumination Do. As a result, the amount of light L which reaches the vicinity of the end portions of the opening for illumination Do, that is to say, the vicinity of the end portions of the backlight device 103, becomes relatively great. In addition, there is less lack of brightness in the vicinity of the end portions of the backlight device 103, and thus, the same effects can be gained as in the first embodiment.

Here, as shown in FIG. 13*a*, the light curtain 103*b*2 is not formed in the vicinity of the center portions of the diffusion plate 103*b*, and thus, light L reaches the vicinity of the center portion of the opening for illumination Do, which corresponds to the vicinity of the center portion of the diffusion plate 103*b* without entrance being restricted by the light curtain 103*b*2. As a result, the light curtain 103*b*2 can be provided without the brightness lowering in the vicinity of the center portion of the backlight device 103.

In addition, in the border portion in Modification 2-2 between where the light curtain 103*b*2 is formed on the diffusion plate 103*b* and where it is not, the density of the printed dot pattern with which the light curtain 103*b*2 is formed may smoothly change so that the density gradually becomes lower from the center portion side toward the vicinity of the end portions, for example.

In this configuration, the reflection properties of the diffusion plate 103*b*, that is to say, the reflection properties of the opening for illumination Do, smoothly change from the center portion side toward the vicinity of the end portions, and thus, the brightness of the backlight device 103 also smoothly changes.

Accordingly, images displayed on the liquid crystal panel 120 change smoothly, so that a natural image can be provided to the viewer.

Here, in modification 2-2 also, the region formed with a width of 2 mm to 12 mm from a location corresponding to the end portion of the effective display region Ld (see FIG. 3(*a*)) of the liquid crystal panel 120 is in the vicinity of the end portions of the opening for illumination Do.

Figure 14:
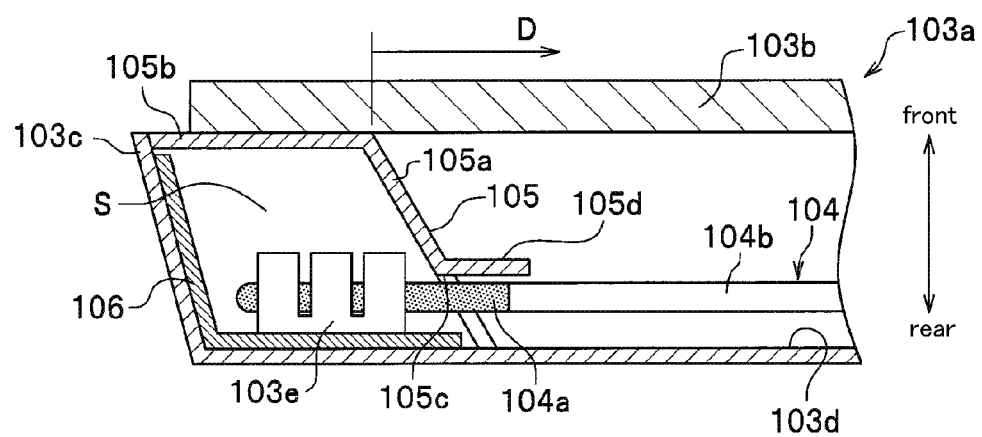
FIG. 14 is a diagram showing an upper side mold with a front cover.

In addition, in many cases the electrode portions 104*a* of the fluorescent tubes 104 (see FIG. 1) are made of a metal having a low reflectance, and thus, light is absorbed by the electrode portions 104*a*, and in some cases the brightness lowers in the vicinity of the end portions of the backlight device 103 (see FIG. 1). In order to prevent this, front covers 105*d* for covering the front side of the electrode portions 104*a* may be formed in the trenches for fixture 105*c* of the upper side mold 105, as shown in FIG. 14, for example. FIG. 14 is a cross sectional diagram along X1-X1 in FIG. 4 showing the front covers provided in the upper side mold.

As shown in FIG. 14, front covers 105*b* for covering the front side of the electrode portions 104*a* are provided, so that light L reflected from the front side toward the electrode portions 104*a* can be reflected again from the front side without being absorbed, and thus, the amount of light L that enters in the vicinity of the end portions of the diffusion plate 103*b* can be prevented from lowering. As a result, the brightness in the vicinity of the end portions of the backlight device 103 (see FIG. 1) can be prevented from lowering.

In addition, the first embodiment and the second embodiment can be applied to the backlight device 103 (see FIG. 1) having a light source unit 103*a* where front covers 105*d* are formed, and thus, the brightness of the backlight device 103 in the vicinity of the end portions can be effectively prevented from lowering.

Though first embodiment and the second embodiment of the present invention are separately described above, the above described embodiments may be used in combination. The first embodiment and its modification 1-1 may be combined, for example, so that the size of the diffusion plate 103*b* (see FIG. 6(*a*)) and the diffusion sheet 134*c* or the prism sheet 134*b* (see FIG. 7(*a*)) are smaller than the opening for illumination Do (see FIG. 6(*a*)) in the diffusion region D in the configuration.

In addition, the first embodiment and the second embodiment may be combined, so that the diffusion plate 103*b* (see FIG. 6(*a*)) of which the size is smaller than the opening for illumination Do in the diffusion region D and the slightly reflective member 134*d* (see FIG. 11(*a*)) are provided in the configuration.

As described above, the embodiments of the present invention and their modifications may be combined as appropriate in the configuration.

The invention claimed is:

1. A liquid crystal display device, comprising:
a liquid crystal panel;
a light source unit for emitting light with which said liquid crystal panel is illuminated; and
an optical member having such reflection properties that light emitted by said light source unit is converted to a surface light source, characterized in that
said light source unit comprises:
a housing having an opening;
a light source provided inside said housing; and
at least one cover member having a blocking plate for forming a diffusion region where light emitted by said light source is scattered;
wherein two cover members are provided in two end portions inside said housing so that the blocking plates thereof face each other, and a region sandwiched between said facing blocking plates and a region surrounded by said housing form said diffusion region where said housing has the opening;
wherein said optical member is provided so as to cover the opening of said diffusion region and is formed so that said reflection properties are different in the vicinity of the end portions and in the center portion of the opening of said diffusion region; and
wherein a part of said optical member is not provided in the vicinity of the end portions of the opening of said diffusion region and is not provided on or above said at least one cover member.

2. The liquid crystal display device according to claim 1, characterized in that
said optical member includes a diffusion plate for converting light emitted by said light source to a surface light source through diffusion and transmission, and
said diffusion plate is said part of said optical member that is not provided in the vicinity of the end portions of the opening of said diffusion region.

3. The liquid crystal display device according to claim 1, characterized in that
said optical member includes a diffusion plate with prisms which diffuse and transmit light emitted by said light source and refracts and scatters light by means of a prism pattern formed on a surface thereof, and thus converts light to a surface light source; and said diffusion plate with prisms is not provided in the vicinity of an end portion of the opening of said diffusion region.

4. The liquid crystal display device according to claim 1, characterized in that said optical member includes at least one diffusion sheet which diffuses light emitted by said light source; and
said diffusion sheet is not provided in the vicinity of an end portion of the opening of said diffusion region.

5. The liquid crystal display device according to claim 1, characterized in that
said optical member includes a partially reflective member for reflecting part of light emitted by said light source; and
said partially reflective member is not provided in the vicinity of an end portion of the opening of said diffusion region, so that said reflection properties are different between the vicinity of an end portion and the center portion of the opening of said diffusion region.

6. The liquid crystal display device according to claim 5, characterized in that said partially reflective member is not provided in the vicinity of the center portion of the opening of said diffusion region.

7. The liquid crystal display device according to claim 1, characterized in that the vicinity of an end portion of the opening of said diffusion region is a region formed with a width of 2 mm to 12 mm from an end portion of an effective display region of said liquid crystal panel.

8. The liquid crystal display device according to claim 1, characterized in that
said light source comprises at least one elongated fluorescent tube in, tubular form, and
said blocking plate is provided so as to block an end portion of said at least one fluorescent tube from said diffusion region.

9. The liquid crystal display device according to claim 1, characterized in that said light source comprises at least one LED.

10. A liquid crystal display device comprising:
a liquid crystal panel;
a light source unit for emitting light with which said liquid crystal panel is illuminated; and
an optical member having such reflection properties that light emitted by said light source unit is converted to a surface light source, characterized in that
said light source unit comprises:
a housing having an opening;
a light source provided inside said housing; and
at least one cover member having a blocking plate for forming a diffusion region where light emitted by said light source is scattered;
wherein two cover members are provided in two end portions inside said housing so that the blocking plate thereof face each other, and a region sandwiched between said facing blocking plates and a region surrounded by said housing form said diffusion region where said housing has the opening;
wherein said optical member is provided so as to cover the opening of said diffusion region and is formed so that said reflection properties are different in the vicinity of the end portions and in the center portion of the opening of said diffusion region;
wherein a part of said optical member has a prism pattern which diffuses and transmits light emitted by said light source; and
wherein said prism pattern is not formed in the vicinity of an end portion of the opening of said diffusion region, and is not formed above said at least one cover member.

11. The liquid crystal display device according to claim 10, characterized in that
said optical member includes a prism sheet where a prism pattern for scattering light emitted by said light source through refraction is formed; and
said prism pattern of said prism sheet is not formed in a location which corresponds to the vicinity of an end portion of the opening of said diffusion region.

12. A liquid crystal display device comprising:
a liquid crystal panel;
a light source unit for emitting light with which said liquid crystal panel is illuminated; and
an optical member having such reflection properties that light emitted by said light source unit is converted to a surface light source, characterized in that
said light source unit comprises:
a housing having an opening;
a light source provided inside said housing; and
at least one cover member having a blocking plate for forming a diffusion region where light emitted by said light source is scattered;
wherein two cover members are provided in two end portions inside said housing so that the blocking plates thereof face each other, and a region sandwiched between said facing blocking plates and a region surrounded by said housing form said diffusion region wherein said housing has the opening;
wherein said optical member is provided so as to cover the opening of said diffusion region and is formed so that said reflection properties are different in the vicinity of the end portions and in the center portion of the opening of said diffusion region;
wherein said optical member includes a diffusion plate which diffuses and transmits light emitted by said light source and converts the light to a surface light source;
wherein an entrance restricting region for restricting the amount of light that enters is formed in said diffusion plate; and
wherein said entrance restricting region is not formed in a location which corresponds to the vicinity of an end portion of the opening of said diffusion region, so that said reflection properties are different in the vicinity of an end portion and in the center portion of the opening of said diffusion region.

13. The liquid crystal display device according to claim 12, characterized in that said entrance restricting region is formed of a light curtain obtained by printing a dot pattern.

14. The liquid crystal display according to claim 12, characterized in that said entrance restricting region is not formed in a location which corresponds to the vicinity of a center portion of the opening of said diffusion region.

15. A liquid crystal display device comprising:
a liquid crystal panel;
a light source unit for emitting light with which said liquid crystal panel is illuminated; and
an optical member having such reflection properties that light emitted by said light source unit is converted to a surface light source, characterized in that
said light source unit comprises:
a housing having an opening;
a light source provided inside said housing; and
at least one cover member having a blocking plate for forming a diffusion region where light emitted by said light source is scattered;

wherein two cover members are provided in two end portions inside said housing so that the blocking plates thereof face each other, and a region sandwiched between said facing blocking plates and a region surrounded by said housing form said diffusion region where said housing has the opening;

wherein said optical member is provided so as to cover the opening of said diffusion region and is formed so that said reflection properties are different in the vicinity of the end portions and in the center portion of the opening of said diffusion region;

wherein said optical member includes at least one diffusion sheet which diffuses light emitted by said light source; and wherein a diffusion portion for diffusing light is not formed in a location which corresponds to the vicinity of an end portion of the opening of said diffusion region in said at least one diffusion sheet, so that light does not diffuse in a location which corresponds to the vicinity of an end portion of the opening of said diffusion region.

16. A liquid crystal display device comprising:
a liquid crystal panel;
a light source unit for emitting light with which said liquid crystal panel is illuminated; and
an optical member having such reflection properties that light emitted by said light source unit is converted to a surface light source, characterized in that
said light source unit comprises:
a housing having an opening;
a light source provided inside said housing; and
at least one cover member having a blocking plate for forming a diffusion region where light emitted by said light source is scattered;
wherein two cover members are provided in two end portions inside said housing so that the blocking plates thereof face each other, and a region sandwiched between said facing blocking plates and a region surrounded by said housing form said diffusion region wherein said housing has the opening;
wherein said optical member includes at least one diffusion sheet where a diffusion portion for diffusing light emitted by said light source and a partially reflective portion for reflecting part of light toward said light source are formed; and
wherein said partially reflective portion is not formed in a location which corresponds to the vicinity of an end portion of the opening of said diffusion region in the diffusion sheet where said partially reflective portion is formed, so that said reflection properties are different in the vicinity of an end portion and in the center portion of the opening of said diffusion region.

17. The liquid crystal display device according to claim 16, characterized in that said partially reflective portion is made up of a transparent electrode formed on a surface of said diffusion sheet.

18. The liquid crystal display device according to claim 16, characterized in that said partially reflective portion is not formed in a location which corresponds to the vicinity of the center portion of the opening of said diffusion region.

19. A liquid crystal display device according comprising:
a liquid crystal panel
a light source unit for emitting light with which said liquid crystal panel is illuminated; and
an optical member having such reflection properties that light emitted by said light source unit is converted to a surface light source, characterized in that
said light source unit comprises:
a housing having an opening;
a light source provided inside said housing; and
at least one cover member having a blocking plate for forming a diffusion region where light emitted by said light source is scattered;
wherein two cover members are provided in two end portions inside said housing so that the blocking plates thereof face each other, and a region sandwiched between said facing blocking plates and a region surrounded by said housing form said diffusion region where said housing has the opening;
wherein said optical member is provided so as to cover the opening of said diffusion region and is formed so that said reflection properties are different in the vicinity of the end portions and in the center portion of the opening of said diffusion region; and
wherein said optical member is formed so that said reflection properties gradually change from the center portion toward the vicinity of an end portion of the opening of said diffusion region.

20. The liquid crystal display device according to claim 19, characterized in that
said optical member includes a diffusion plate for converting light emitted by said light source to a surface light source through diffusion and transmission;
an entrance restricting region for restricting the amount of light that enters is formed of a light curtain where a dot pattern is printed on said diffusion plate; and
the density of said printed dot pattern gradually lowers from a location which corresponds to the center portion of the opening of said diffusion region toward a location which corresponds to the vicinity of an end portion in said light curtain.

21. The liquid crystal display device according to claim 19, characterized in that
said optical member includes a diffusion plate with prisms for diffusing and transmitting light emitted by said light source and converting light to a surface light source by scattering the light by means of a prism pattern formed on a surface thereof through refraction; and
the density of said prism pattern gradually lowers from a location which corresponds to the center portion of the opening of said diffusion region to allocation which corresponds to the vicinity of an end portion in said diffusion plate with prisms.

22. The liquid crystal display device according to claim 19, characterized in that said optical member includes a prism sheet where a prism pattern for scattering light emitted by said light source through refraction is formed; and
the density of said prism pattern gradually lowers from a location which corresponds to the center portion of the opening of said diffusion region to a location which corresponds to the vicinity of an end portion in said prism sheet.

23. The liquid crystal display device according to claim 19, characterized in that
said optical member includes at least one diffusion sheet where a diffusion portion for diffusing light is formed so as to diffuse light; and
the degree to which light diffuses in said diffusing portion gradually becomes smaller from a location which corresponds to the center portion of the opening of said diffusion region toward a location which corresponds to the vicinity of an end portion.

* * * * *